(12) United States Patent
Oi et al.

(10) Patent No.: US 9,000,378 B2
(45) Date of Patent: Apr. 7, 2015

(54) OPTICAL DETECTION DEVICE, AND APPARATUS USING SAME

(75) Inventors: Kana Oi, Osaka (JP); Takayuki Nishikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 106 days.

(21) Appl. No.: 13/812,912

(22) PCT Filed: Dec. 21, 2011

(86) PCT No.: PCT/JP2011/079588
§ 371 (c)(1),
(2), (4) Date: Jan. 29, 2013

(87) PCT Pub. No.: WO2012/086665
PCT Pub. Date: Jun. 28, 2012

(65) Prior Publication Data
US 2013/0126739 A1    May 23, 2013

(30) Foreign Application Priority Data

Dec. 21, 2010  (JP) ................................. 2010-284238
Sep. 22, 2011  (JP) ................................. 2011-207955

(51) Int. Cl.
*G01J 5/02* (2006.01)
*G01J 5/08* (2006.01)
*G01J 1/02* (2006.01)
(Continued)

(52) U.S. Cl.
CPC ............. *G01J 5/0806* (2013.01); *G01J 1/0266* (2013.01); *G01J 1/0407* (2013.01); *G01J 1/0411* (2013.01); *G01J 5/0025* (2013.01)

(58) Field of Classification Search
USPC ........................................................ 250/353
See application file for complete search history.

(56) References Cited

U.S. PATENT DOCUMENTS

| | | | |
|---|---|---|---|
| 4,787,722 | A | 11/1988 | Claytor |
| 5,054,905 | A | 10/1991 | Cohen |
| 5,138,495 | A | 8/1992 | Shiono et al. |

(Continued)

FOREIGN PATENT DOCUMENTS

| | | |
|---|---|---|
| CN | 101772694 | 7/2010 |
| DE | 69103707 T2 | 4/1995 |

(Continued)

OTHER PUBLICATIONS

Yeh, Optical geometry approach for elliptical Fresnel lens design and chromatic aberration, Solar Energy Materials & Solar Cells 93(2009) 1309-1317.*

(Continued)

*Primary Examiner* — David Porta
*Assistant Examiner* — Abra Fein
(74) *Attorney, Agent, or Firm* — Greenblum & Berstein, P.L.C.

(57) ABSTRACT

Each lens of a multi-segment lens is a Fresnel lens in which a second surface, being the reverse side surface of a first surface, has a plurality of lens surfaces. At least one of the plurality of lens surfaces is configured from a part of a side surface of an elliptical cone having a central axis oblique to a normal line of the first surface. Any normal line intersecting with the lens surface configured from the part of the side surface of the elliptical cone among normal lines of respective points on the first surface is non-parallel to a central axis of the elliptical cone corresponding to the lens surface with which the any normal line intersects.

14 Claims, 19 Drawing Sheets

(51) Int. Cl.
    *G01J 1/04*     (2006.01)
    *G01J 5/00*     (2006.01)

(56) References Cited

U.S. PATENT DOCUMENTS

| | | | |
|---|---|---|---|
| 5,442,178 | A | 8/1995 | Baldwin |
| 8,648,307 | B2 | 2/2014 | Nishikawa et al. |
| 2005/0024746 | A1 | 2/2005 | Shimura |
| 2005/0127298 | A1* | 6/2005 | DiPoala ............ 250/342 |
| 2005/0180014 | A1 | 8/2005 | Nikolov et al. |
| 2013/0141800 | A1 | 6/2013 | Oi et al. |

FOREIGN PATENT DOCUMENTS

| | | |
|---|---|---|
| EP | 0468410 | 1/1992 |
| JP | 62-081615 | 4/1987 |
| JP | 03-186802 | 8/1991 |
| JP | 03-186803 | 8/1991 |
| JP | 4-84103 | 3/1992 |
| JP | 07-36041 | 4/1995 |
| JP | 08-321215 | 12/1996 |
| JP | 3090336 | 9/2000 |
| JP | 3090337 | 9/2000 |
| JP | 2003-4910 | 1/2003 |
| JP | 2008-052049 | 3/2008 |
| WO | 2008/149926 | 12/2008 |
| WO | WO 2008149926 A1 * | 12/2008 |
| WO | 2012/043471 | 4/2012 |

OTHER PUBLICATIONS

International Search Report for corresponding International Application No. PCT/JP2011/079588, along with an English language version, dated Apr. 10, 2012.
Written Opinion of the International Searching Authority for corresponding International Application No. PCT/JP2011/079588, dated Apr. 10, 2012.
U.S. Appl. No. 13/749,767 to Oi et al., filed Jan. 25, 2013.
Office Action in U.S. Appl. No. 13/749,767, dated May 22, 2014.
Hiroshi Kubota, "Optics", 12th edition, Iwanami Shoten Co., Apr. 9, 1986, pp. 282-283, with a partial English language translation thereof.
International Search Report and Written Opinion for PCT/JP2011/0071879, dated Dec. 13, 2011, with an English language translation of ISR.
Search Report in Taiwanese Patent Application No. 100147699, dated Jul. 22, 2014.

* cited by examiner

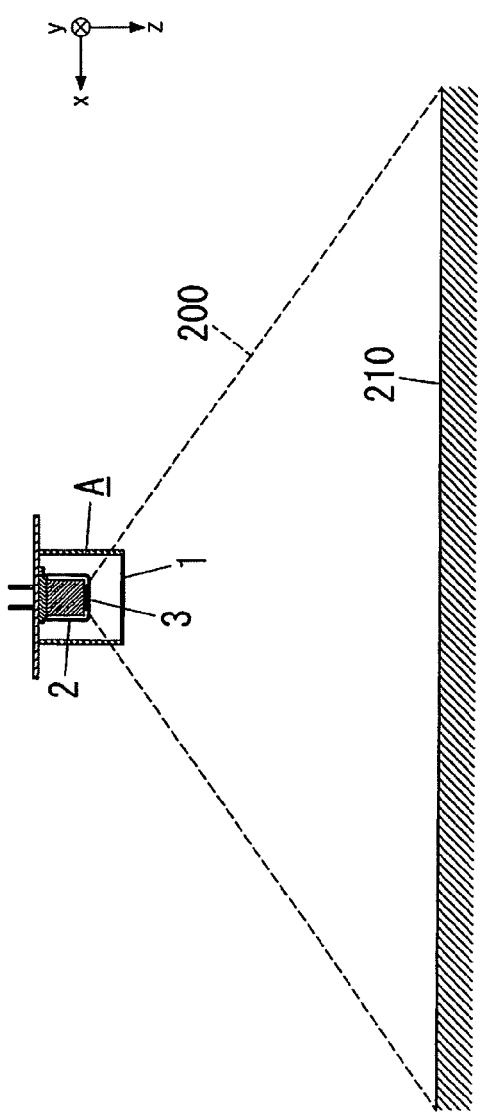
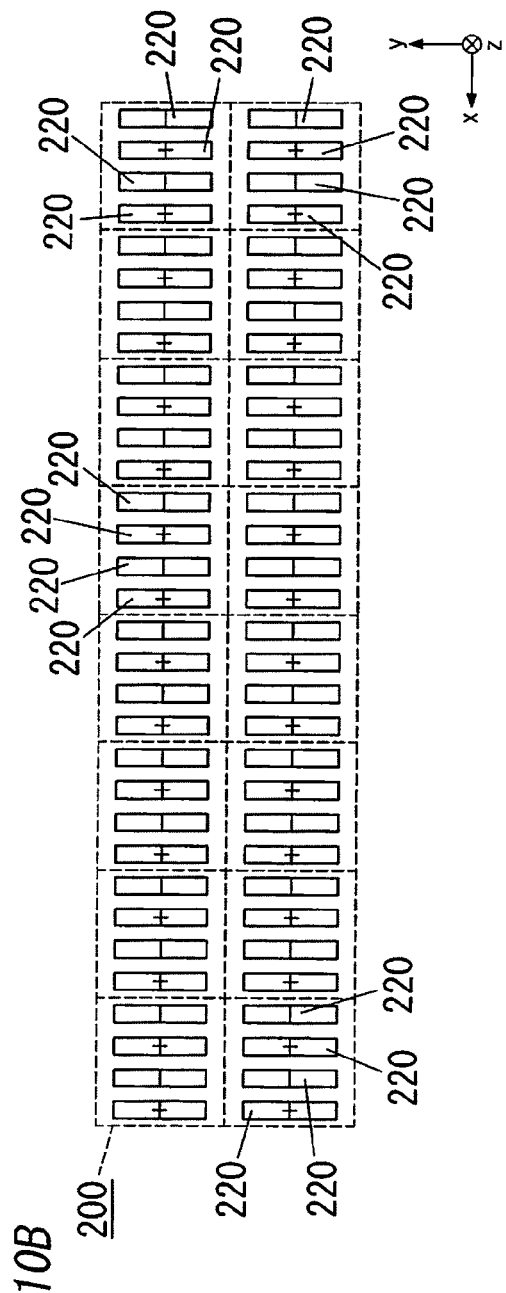
FIG. 10A
FIG. 10B

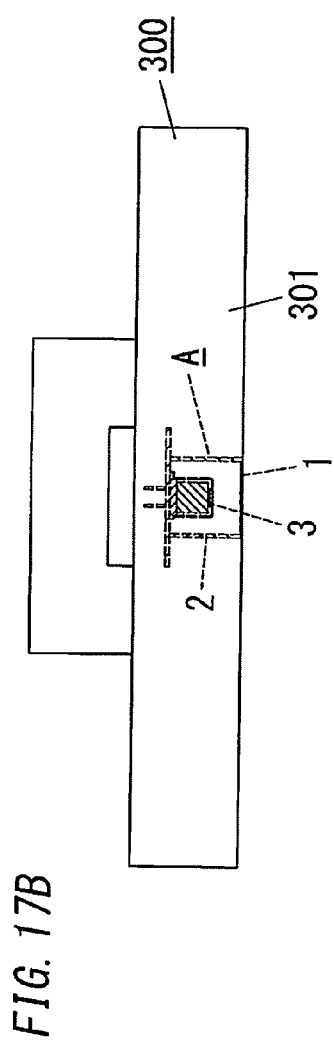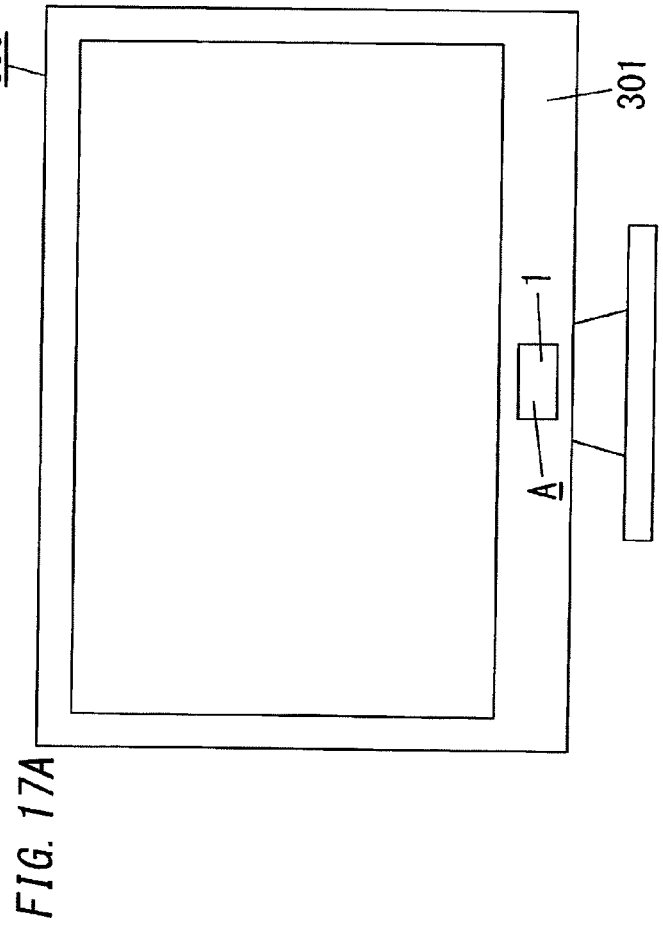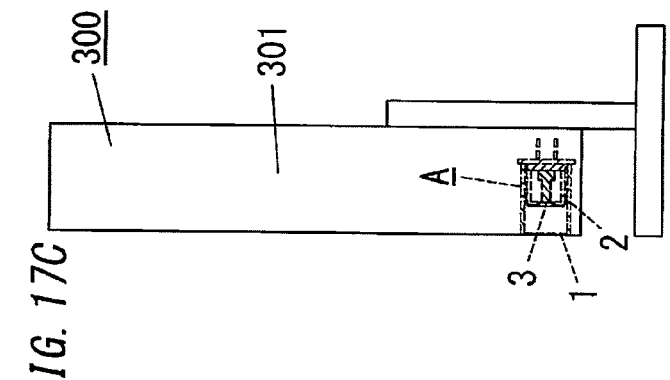

US 9,000,378 B2

OPTICAL DETECTION DEVICE, AND APPARATUS USING SAME

TECHNICAL FIELD

The present invention relates to an optical detection device, and an apparatus using the same.

BACKGROUND ART

Conventionally, devices used for a purpose of detecting an amount of change of infrared light emitted from a human body in a predetermined detection area and controlling apparatuses such as lighting apparatuses are proposed as an optical detection device (e.g., Japanese Patent Publication Nos. 3090336 and 3090337).

Optical detection devices described in the aforementioned two documents each include a multi-segment lens configured by combining a plurality of lenses having substantially the same focal position on a single plane, and an infrared detecting element that is a light receiving element arranged on the aforementioned focal position. The aforementioned two documents describe that 4*15 detection beams are created, in a case where the infrared detecting element configured by arranging four light receiving units (device elements) is employed, and the multi-segment lens configured by arranging fifteen lenses in five columns and three rows is employed.

In each lens of the multi-segment lens, a first surface is a plane surface, a second surface is a hyperboloid having a principal axis oblique to a normal line of the first surface. Specifically, as shown in FIG. 19, in a lens 101, a rotation axis C of a hyperboloid 120 that is the second surface is inclined so that the rotation axis C and a normal line H of a plane surface 110 that is the first surface form an angle θ.

Here, assuming that L denotes a distance between an apex O of the lenses 101 and a center of an infrared detecting element (not shown), and f denotes a focal distance of the lens 101, an angle δ formed by incident light D reaching a focal point F through the apex O of the lens with respect to the normal line H is obtained according to the following Formula:

[Math. 1]

$$\delta = \arctan(L/f) \quad \text{Formula (1)}.$$

Assuming that n denotes a refractive index of the lens 101, the following Formula is obtained:

[Math. 2]

$$n \cdot \sin\theta = \sin\delta \quad \text{Formula (2)}.$$

Therefore, the angle θ is as follows:

[Math. 3]

$$\theta = \arcsin(\sin\delta/n) \quad \text{Formula (3)}.$$

The angle θ is determined according to Formula (3).

The lens 101 is provided as a light collection optical system, and the incident light D reaching the focal point F through the apex O forms the angle δ with respect to the normal line H, and is aplanatically collected on the focal point F. In this lens 101, when the angle θ is increased, the angle δ formed by the incident light D aplanatically collected on the focal point F and the normal line H is also increased.

The aforementioned two documents describe that polyethylene is employed as a material of the multi-segment lens, and the multi-segment lens is produced by injection molding.

However, even when the lens 101 formed by polyethylene has a thickness of 1 mm, transmittance of infrared light with a wavelength of around 10 μm, which is vertically incident upon the plane surface 110 of the lens 101, is 40%. In addition, the larger the thickness is, the lower the transmittance is. A light pass length of the incident light D incident from a direction not perpendicular to the plane surface 110 of the lens 101 may be longer than a maximum thickness of the lens 101, and the transmittance thereof may become too lower. Furthermore, in the lens 101 formed by polyethylene, in a case where the change in the thickness is large, sink marks occur on the surface of the lens 101 due to cooling of the injection molding, shrinkage unevenness caused during a solidification process, or the like. Therefore, appearance of the lens 101 is damaged.

So, in order to suppress the reduction in the transmittance and the occurrence of the sink marks, the aforementioned two documents describe that a minimum thickness of the lens 101 is set to 0.3 mm that is a minimum value allowable in the light of liquidity of polyethylene in injection molding, and difference between the maximum and minimum thicknesses of the lens 101, which has an influence on securement of a lens area (effective lens area), is set to 0.5 mm that is a minimum value necessary for securing a predetermined lens area depending on the intended use of an optical detection device (for sink light), so that the maximum thickness of the lens 101 is kept to be 1 mm or less.

Japanese Examined Patent Publication No. 7-36041 proposes that a condenser lens 401 is a Fresnel lens, and a rotation axis C shared by hyperboloids 421, 422 and 423 of a second surface is oblique to a plane surface 410 of a first surface in order to suppress occurrence of an off-axis aberration, as shown in FIG. 20. In this case, the hyperboloids 421, 422 and 423 configure respective lens surfaces.

The aforementioned document describes that in the Fresnel lens 401 in FIG. 20, an angle can be formed between a parallel light beam aplanatically collected on a focal point and a normal line N of the plane surface 410 according to an angle formed by the rotation axis C shared by the hyperboloids 421, 422 and 423 and the plane surface 410. Therefore, in the Fresnel lens 401 in FIG. 20, the occurrence of the off-axis aberration can be suppressed, and light beams from a direction oblique to the normal line N of the plane surface 410 can be effectively collected.

However, in the Fresnel lens 401 configured such that the rotation axis C of the hyperboloids 421, 422 and 423 configuring an emission surface is oblique to the normal line N of the plane surface 410 that is an incident surface, the hyperboloids 421, 422 and 423 are not rotationally symmetric with respect to the normal line N of the plane surface 410. Therefore, the Fresnel lens 401 or a metal mold for the Fresnel lens 401 is difficult to be produced by rotary forming with a lathe or the like.

So, when the Fresnel lens 401 or the metal mold for the Fresnel lens 401 is produced, it is necessary to use a multiaxis control processing machine and form the hyperboloids 421, 422 and 423 or respective curved surfaces by cutting at minute pitches while only a blade edge of a sharp cutting tool (tool) 430 with a nose radius (also referred to as a corner radius) of a few micro-meters is brought into point contact with a workpiece 440, as shown in FIG. 21. The workpiece 440 is a base material for directly forming the Fresnel lens 401, or a base material for forming the metal mold. Therefore, the processing time for producing the aforementioned Fresnel lens 401 or metal mold for the Fresnel lens 401 is increased, and then the cost of the Fresnel lens 401 is increased.

On the other hand, in a case where the cross-sectional shape of each lens surface in the cross-sectional shape including the normal line of the plane surface that is the incident surface of the Fresnel lens is linear, the lens surfaces or the curved surfaces corresponding to the lens surfaces can be formed by cutting while the cutting tool 430 is inclined with respect to the workpiece 440 so as to bring a side surface of a blade into line contact with the workpiece 440, as shown in FIG. 22, thus enabling significant reduction of the processing time. Here, in a Fresnel lens in which the shape of each lens surface in an emission surface is rotationally symmetric by employing a normal line of the incident surface as a rotation axis, it is known that each lens surface is approximated by a side surface of a frustum of cone, thereby enabling the cross-sectional shape of each lens surface to become linear (U.S. Pat. No. 4,787,722).

In the Fresnel lens 401 disclosed in the aforementioned Japanese Examined Patent Publication No. 7-36041 and the Fresnel lens disclosed in the U.S. Pat. No. 4,787,722, an intended light beam is infrared light, and these two documents disclose that polyethylene is used as a lens material.

Incidentally, the present inventors have conceived that, in the case where an apparatus is equipped with an optical detection device, since a multi-segment lens configures a part of the appearance of the apparatus, a surface, upon which infrared light is incident, of each lens of the multi-segment lens is formed to a plane surface or a curved surface with small curvature, in order not to damage the design of the apparatus. In a case where the apparatus equipped with the optical detection device is an alarm sensor, the present inventors have conceived that it is necessary to provide the optical detection device so that a suspicious person cannot find the presence of the optical detection device or a detection area of the alarm sensor. Furthermore, the present inventors have conceived that in a case where examples of the apparatus equipped with the optical detection device include an apparatus, in which a distance between a person and an optical detection device is relatively short, such as a television or a display of a personal computer, and an apparatus such as an alarm sensor, the appearance of the multi-segment lens is important, and lens patterns preferably cannot be visually recognized even when looking into the apparatus from a relatively close (e.g., about 30 cm) place. So, in the optical detection device described above, it is conceived that the difference between the maximum and minimum thicknesses of each lens 101 of the multi-segment lens is set to a value smaller than 0.5 mm described above, for example. However, while this can make it difficult to visually recognize the lens patterns, the predetermined lens area cannot be secured, and consequently, sensitivity is reduced.

Thus, an option of employing the Fresnel lens as a lens capable of making it difficult to visually recognize the lens patterns formed on the second surface is offered. However, in the Fresnel lens in which the shape of each lens surface in an emission surface is rotationally symmetric by employing the normal line of the incident surface as the rotation axis, in the lens surface being approximated by the side surface of the frustum of cone, an off-axis aberration occurs in a case of utilizing incident light (e.g., infrared light) obliquely incident upon the first surface from the outside world.

DISCLOSURE OF THE INVENTION

An object of the present invention is to provide an optical detection device, which is capable of suppressing occurrence of off-axis aberrations of lenses utilizing incident light obliquely incident upon first surfaces from the outside world, suppressing reduction of sensitivity, and reducing the cost, while enhancing the appearance of a multi-segment lens, by making it difficult to visually recognize the lens patterns, which are formed on second surface sides of the lenses of the multi-segment lens, from the first surface sides of the lenses, and an apparatus using the same.

An optical detection device according to the present invention includes a multi-segment lens configured by combining a plurality of lenses having the same focal position, and an infrared light sensor having an infrared light receiving element arranged on the focal position, wherein each of the plurality of lenses of the multi-segment lens is a Fresnel lens in which a second surface, being the reverse side surface of a first surface, has a plurality of lens surfaces, at least one of the plurality of lens surfaces is configured from a part of a side surface of an elliptical cone, and wherein any normal line intersecting with the lens surface configured from the part of the side surface of the elliptical cone among normal lines of respective points on the first surface is non-parallel to a central axis of the elliptical cone corresponding to the lens surface with which the any normal line intersects.

In the optical detection device according to the present invention, the lens patterns formed on the second surface sides of lenses of the multi-segment lens are made difficult to be visually recognized from the first surface sides of the lenses, thereby being capable of suppressing occurrence of off-axis aberrations of the lenses utilizing incident light obliquely incident upon the first surfaces from the outside world, suppressing reduction of sensitivity, and reducing the cost, while enhancing the appearance of the multi-segment lens.

In the optical detection device, preferably, at least two of the plurality of lens surfaces are configured from parts of side surfaces of elliptical cones having the different central axes respectively, and wherein as a lens surface among the at least two of the plurality of lens surfaces is located further outside, an angle formed by the normal line and the central axis of the elliptical cone corresponding to the lens surface becomes larger.

In the optical detection device, preferably, a lens surface located on a center among the plurality of lens surfaces of each of the plurality of lenses is configured from a part of an aspheric surface with continuously changing curvature, and wherein any normal line intersecting with the lens surface that is located on the center and is configured from the part of the aspheric surface among the normal lines of the respective points on the first surface is non-parallel to an axis of symmetry of the aspheric surface corresponding to the lens surface located on the center with which the any normal line intersects.

In the optical detection device, the aspheric surface is preferably a hyperboloid.

In the optical detection device, the multi-segment lens is preferably configured so that, among the plurality of lenses, a lens which is further separated from a center of the multi-segment lens has a larger lens area of the second surface.

In the optical detection device, the multi-segment lens is preferably configured so that maximum thicknesses of the plurality of lenses are the same.

In the optical detection device, the infrared light receiving element preferably includes a plurality of device elements each formed into a rectangle, and the plurality of device elements are arranged so that short side directions of the plurality of device elements coincide with each other.

In the optical detection device, preferably, the infrared light receiving element is configured by arranging four device elements in the form of a 2*2 matrix, each of the four device elements being formed into a square, and wherein the four device elements are arranged so that a direction, in which respective single diagonal lines of two device elements located on diagonal positions among the four device elements are connected with a straight line, coincides with a right-left direction.

In the optical detection device, preferably, arrangement of a plurality of detection beams formed by the plurality of lenses of the multi-segment lens and the infrared detecting element is staggered.

In the optical detection device, preferably, the plurality of lenses include a first lens group linearly arranged along at least one direction, and wherein the infrared light receiving element is configured by arranging four device elements in the form of a 2*2 matrix, each of the four device elements being formed into a square, and wherein the device elements are arranged so that a direction, in which respective single diagonal lines of two device elements located on diagonal positions among the four device elements are connected with a straight line, coincides with the one direction.

In the optical detection device, the plurality of lenses preferably further include a second lens group adjacent to the first lens group and arranged along the one direction, and among the plurality of lenses, lenses of the second lens group are preferably arranged to be staggered with respect to lenses of the first lens group.

In the optical detection device, a lens material of the multi-segment lens is preferably polyethylene.

In the optical detection device, preferably, a lens material of the multi-segment lens is polyethylene, and the first surface is a curved surface that is convex toward a side opposite to the second surface.

An apparatus according to the present invention includes the above-mentioned optical detection device.

The apparatus according to the present invention includes the optical detection device capable of suppressing occurrence of off-axis aberrations of lenses utilizing incident light obliquely incident upon the first surfaces from the outside world, suppressing reduction of sensitivity, and reducing the cost, while enhancing the appearance of the multi-segment lens, by making it difficult to visually recognize the lens patterns, which are formed on the second surface sides of the lenses of the multi-segment lens, from the first surface sides of the lenses, and hence the appearance of the overall apparatus equipped with the optical detection device can be enhanced while suppressing the reduction of the sensitivity of the optical detection device and reducing the cost.

BRIEF DESCRIPTION OF THE DRAWINGS

Preferred embodiments of the invention will now be described in further details. Other features and advantages of the present invention will become better understood with regard to the following detailed description and accompanying drawings where:

FIG. 10A is an explanatory diagram of a detection area according to yet another configuration example of the optical detection device of the embodiment;

FIG. 10B is an explanatory diagram of the detection area according to said yet another configuration example of the optical detection device of the embodiment;

FIG. 17A is a schematic front view of an apparatus including the optical detection device of the embodiment;

FIG. 17B is a schematic top plan view of the apparatus including the optical detection device of the embodiment;

FIG. 17C is a schematic side view of the apparatus including the optical detection device of the embodiment;

BEST MODE FOR CARRYING OUT THE INVENTION

Figure 1A:
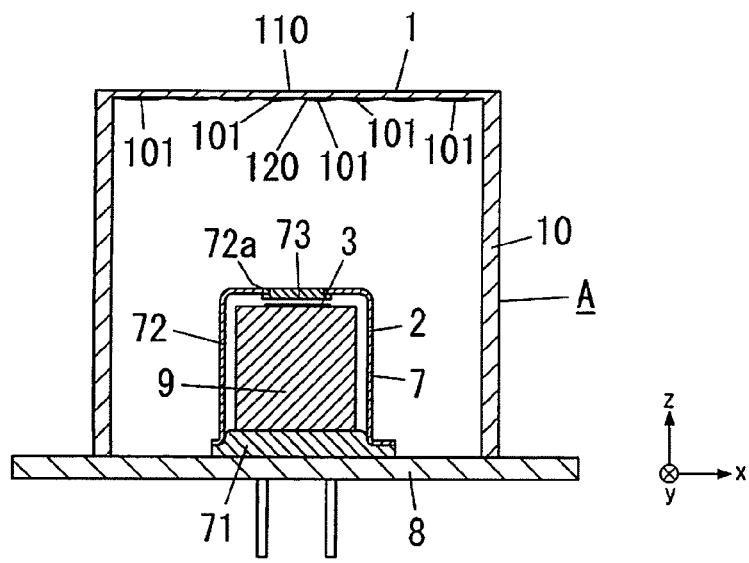
FIG. 1A is a schematic cross-sectional view of an optical detection device of an embodiment.

Hereinafter, an optical detection device will be first described with reference to FIG. 1A to FIG. 6B.

An optical detection device A includes a multi-segment lens 1 that is configured by combining a plurality of lenses 101 having the same focal position F, and an infrared light sensor 2 having an infrared light receiving element 3 arranged on the focal position (focal point) F. In short, the multi-segment lens 1 configures a light collection optical system collecting infrared light. The plurality of lenses 101 are combined on a single surface.

This optical detection device A detects motion of an object (e.g., human or the like) radiating infrared light, and outputs a detection signal. In the optical detection device A, a pyroelectric infrared detecting element is employed as the infrared light receiving element 3.

The infrared light sensor 2 includes an amplification unit 4 amplifying an output signal of the infrared light receiving element 3, a determination unit 5 comparing a voltage signal amplified by the amplification unit 4 with a threshold value and determining whether or not the voltage signal exceeds the threshold value, and an output unit 6 outputting when the determination unit 5 determines that the voltage signal exceeds the threshold value, in addition to the infrared light receiving element 3. In a case where an object to be detected of the optical detection device A is a human, the amplification unit 4 is preferably configured so that, for example, a voltage signal of a frequency component (component centered at 1 Hz) close to the motion of the human is amplified. Then, for example, an amplification unit having a frequency characteristic similar to amplification units described in the above Japanese Patent Publication Nos. 3090336 and 3090337 can be used. Further, the amplification unit 4 can be configured by, for example, a current-voltage conversion circuit converting a pyroelectric current, which is an output signal outputted from the infrared light receiving element 3 into a voltage signal, and a voltage amplifier circuit amplifying a voltage signal in a predetermined frequency band among the voltage signals converted by the current-voltage conversion circuit. Further, the determination unit 5 can be configured, for example, by a comparison circuit using a comparator or the like. The output unit 6 can be configured, for example, by an output circuit outputting a detection signal when the determination unit 5 determines that the voltage signal exceeds the threshold value.

The infrared light sensor 2 includes a package 7 housing the infrared light receiving element 3, the amplification unit 4, the determination unit 5, the output unit 6, and the like, and can be used by being mounted on a circuit board 8 configured from a printed-wiring board. Here, the package 7 houses an element holding member (e.g., MID board or the like) 9 mounted with the infrared light receiving element 3 and the like. The element holding member 9 is also mounted with an IC device (not shown) configured by making the amplification unit 4, the determination unit 5, and the output unit 6 into a single chip.

The package 7 is configured by a disk-shaped stem 71, a closed-bottomed cylindrical cap 72 connected to this stem 71, an infrared transmitting member 73 arranged so as to close an opening 72a formed on a bottom of this cap 72 and having a function of transmitting desired infrared light. For example, a silicon substrate, a germanium substrate or the like is preferably used as the infrared transmitting member 73. In the package 7, both of the stem 71 and the cap 72 are formed by metal materials, and the infrared transmitting member 73 and the cap 72 are connected by a conductive material.

In the optical detection device A, a cover member 10 having the multi-segment lens 1 is arranged on one surface side of the circuit board 8 so as to cover the package 7. A space between the cover member 10 and the package 7 is an air layer and functions as a heat insulating layer.

Figure 6A:
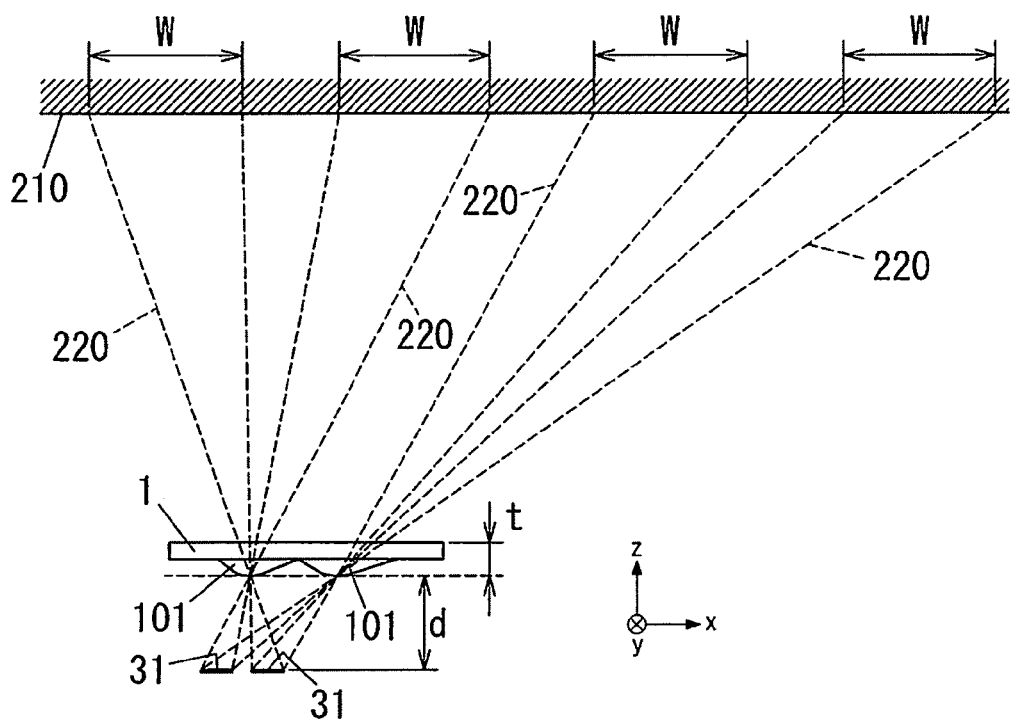
FIG. 6A is a relation explanatory diagram between an infrared light receiving element and detection beams in the optical detection device of the embodiment.
Figure 6B:
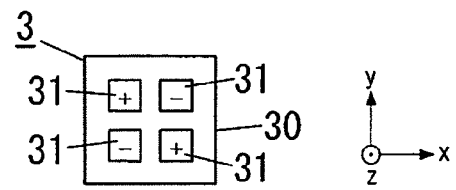
FIG. 6B is a relation explanatory diagram between the infrared light receiving element and the detection beams in the optical detection device of the embodiment.

As the pyroelectric infrared detecting element that configures the infrared light receiving element 3, for example, a quad type pyroelectric element, in which four device elements (light receiving units) 31 are formed on a single pyroelectric substrate 30, can be used, as shown in FIG. 6B. In the infrared light receiving element 3 shown in FIG. 6B, four device elements 31 are arranged in the form of a 2*2 array on the single pyroelectric substrate 30. In an example shown in FIG. 6B, the planar view shape of each device element 31 is a square, and the device elements 31 are arranged so that centers of the device elements 31 are located on four corners of a virtual square inner than an outer circumferential line of the pyroelectric substrate 30 on a central part of the pyroelectric substrate 30.

Each device element 31 of the infrared light receiving element 3 is a capacitor, in which a part of the pyroelectric substrate 30 is interposed between a pair of electrodes (not shown), and polarities of the electrodes located on the multi-segment lens 1 side among the pairs of electrodes of the respective device elements 31 are shown with symbols "+" and "−" in FIG. 6B. In the infrared light receiving element 3, the two device elements 31 with the same polarity on one of diagonal lines of the virtual square, among the four device elements 31 are connected in parallel, and the two device elements 31 with the same polarity on the other diagonal line are connected in parallel. In short, in the infrared light receiving element 3, assuming that respective positive directions of an x-axis, a y-axis and a z-axis are specified as in a rectangular coordinate system shown on the right side of FIG. 6B, the two device elements 31 formed to be aligned along the x-axis direction are connected in inverse parallel, and the two device elements 31 formed to be aligned along the y-axis direction are connected in inverse parallel.

A detection area 200 (see FIGS. 3A and 3B) of the optical detection device A is determined by the infrared light receiving element 3 and the multi-segment lens 1. Therefore, in the detection area 200 of the optical detection device A, the same number of detection beams 220 as the number of the device elements 31 (four in the example of FIG. 6B) are set for each lens 101. The detection beams 220 each are a small range in which an incident amount of infrared light to the infrared light receiving element 3 becomes a peak range, are an effective region in which infrared light from an object to be detected is detected, and also referred to as a detection zone.

Figure 1B:
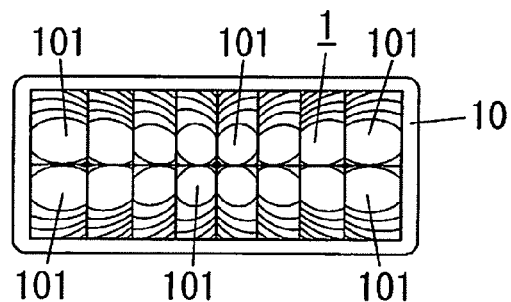
FIG. 1B is a schematic bottom plan view of a main section of the optical detection device of the embodiment.

In the optical detection device A shown in FIG. 1A, the multi-segment lens 1 is configured by the 2*8 lenses 101 as shown in FIG. 1B, so that the 16*4 detection beams 220 are set in the detection area 200 as shown in FIG. 3. The number of the lenses 101 of the multi-segment lens 1 is not particularly limited.

That is, as shown in FIG. 1B, the multi-segment lens 1 includes a first lens group configured from eight lenses 101 on an upper section, linearly arranged along a right-left direction (one direction), and a second lens group adjacent to the first lens group and configured from eight lenses 101 on a lower section, linearly arranged along the right-left direction (one direction) similarly.

Figure 3A:
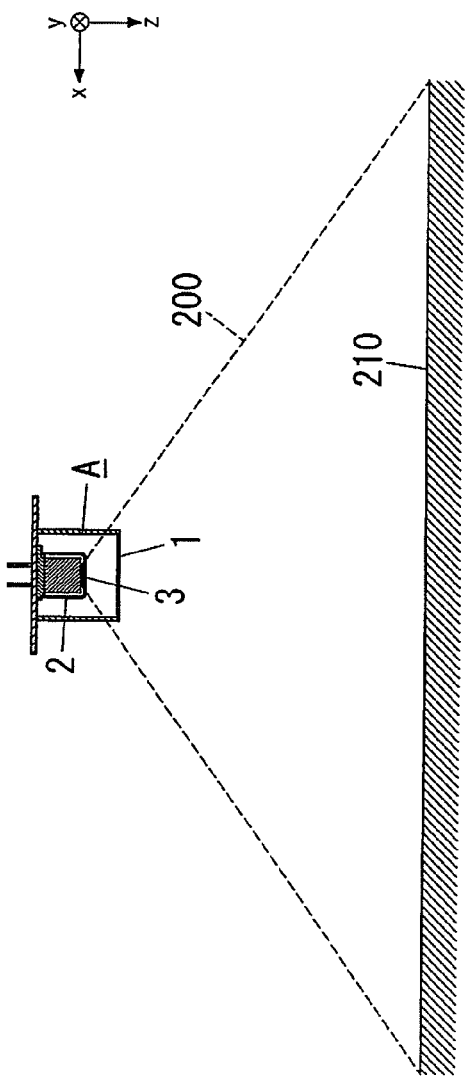
FIG. 3A is an explanatory diagram of a detection area of the optical detection device of the embodiment.
Figure 3B:
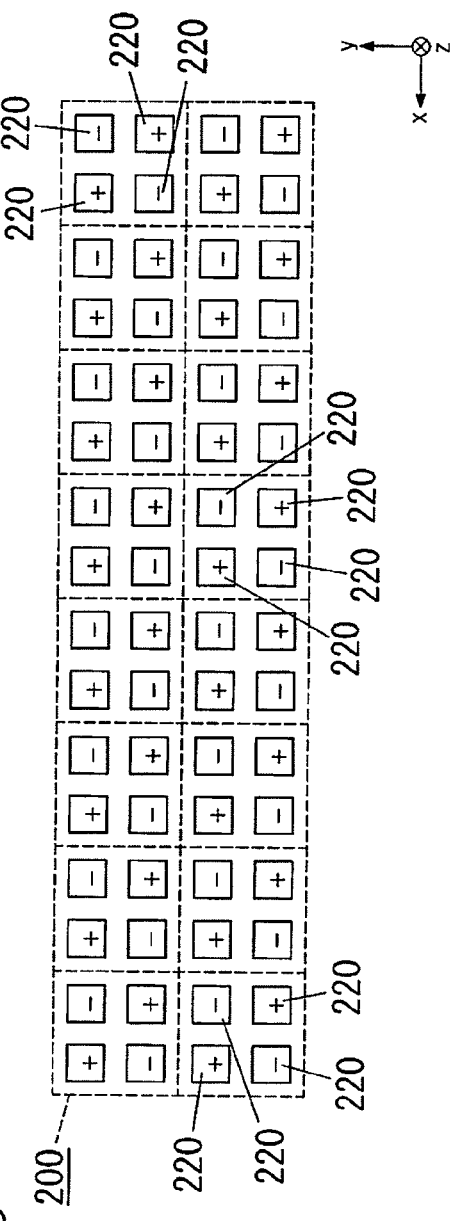
FIG. 3B is an explanatory diagram of the detection area of the optical detection device of the embodiment.

FIGS. 3A and 3B each show the detection area 200 in a case where the optical detection device A is arranged above a floor surface. In FIG. 3B, the polarities of the device elements 31 to which the detection beams 220 correspond are shown in the detection beams 220 on a detection surface 210 set on the floor surface in the detection area 200 with symbols "+" and "−", respectively. In short, the detection beams 220 each have a polarity corresponding to that of the device element 31 on a one-on-one basis.

The detection beams 220 on the detection surface 210 are similar figures to the device elements 31 corresponding to the detection beams 220.

In the multi-segment lens 1, the respective lenses 101 are preferably set to have the same maximum thickness. Here, in the optical detection device A, the maximum thicknesses t of the respective lenses 101 are the same, so that a distance d from the plane surface including a light receiving surface of the infrared detecting element 3 (surfaces of the device elements 31 on the multi-segment lens 1 side) to each lens 101 becomes constant as show in FIG. 6A, and hence widths W of the detection beams 220 on the detection surface 210 can become the same. Therefore, dimensions of the detection beams 220 on the detection surface 210 become constant, so that detection capability on each portion of the detection area 200 can become equivalent. In a case where difference between the maximum thicknesses t of the lenses 101 is about 100 μm, the thicknesses with such difference can be regarded as substantially the same thickness.

Figure 1C:
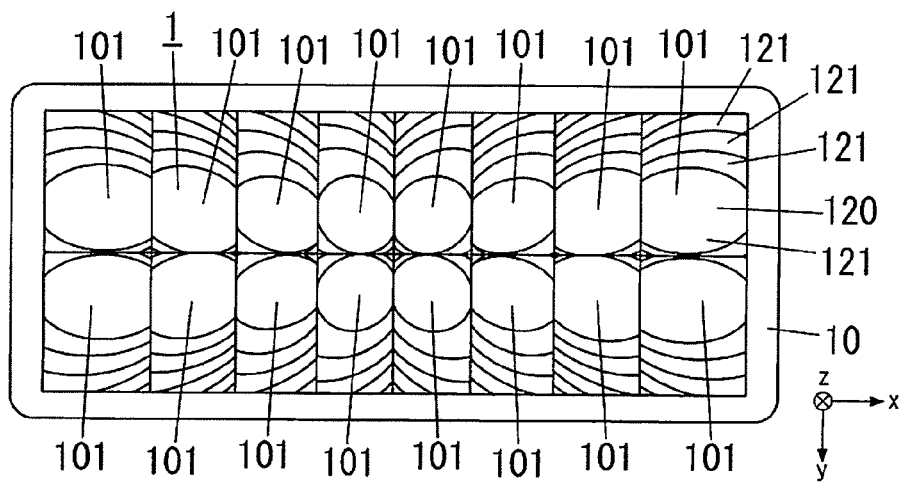
FIG. 1C is an enlarged view of FIG. 1B.
Figure 2:
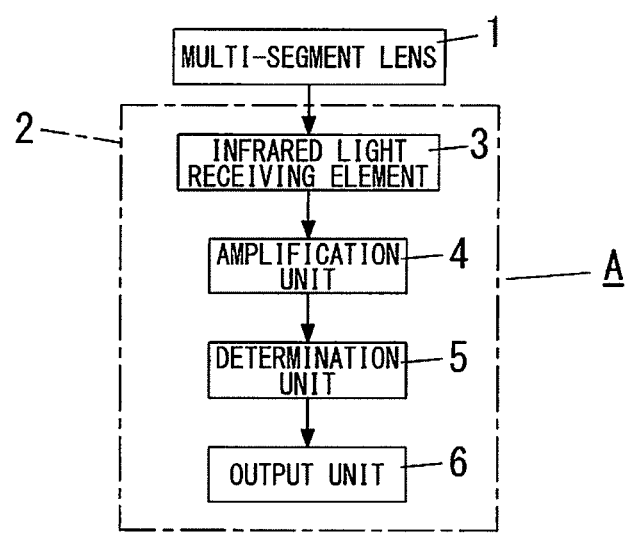
FIG. 2 is a schematic configuration diagram of the optical detection device of the embodiment.

In order to increase the horizontal angle of view in the optical detection device A, the multi-segment lens 1 is configured so that the number of lenses 101 arranged along an x-axis direction in FIG. 1C is larger than the number of lenses 101 arranged along a y-axis direction. Here, in the example shown in FIG. 1C, the number of the lenses 101 arranged along the x-axis direction is eight, and the number of the lenses 101 arranged along the y-axis direction is two. In the optical detection device A, the relative positional relation of the multi-segment lens 1 and the infrared light receiving element 3 is specified such that the positive directions of the x-axis, the y-axis and the z-axis in FIG. 1C correspond to the positive directions of the x-axis, the y-axis and the z-axis in FIG. 6B, respectively. In short, in the infrared light receiving element 3, the four device elements 31 formed in a square are arranged in the form of a 2*2 matrix in planar view, and further the infrared light receiving element 3 is arranged so that a direction along a single side of the above-mentioned virtual square coincides with a right-left direction.

But, the arrangement of the infrared light receiving element 3 is not limited to this, and the device elements 31 may be arranged so that a direction, in which respective diagonal lines of the two device elements 31 located on diagonal positions among the four device elements 31 arranged in the form of a 2*2 matrix are connected with a straight line, coincides with the right-left direction, for example. That is, the infrared light receiving element 3 may be arranged so that a direction along a single diagonal line of the above-mentioned virtual square coincides with the right-left direction.

In other words, the device elements 31 may be arranged so that the direction, in which the single diagonal lines of the two device elements 31 located on the diagonal positions among the four device elements 31 arranged in the form of a 2*2 matrix are connected with the straight line, coincides with a direction, in which the lenses 101 of the first lens group are arranged (one direction).

Figure 7A:
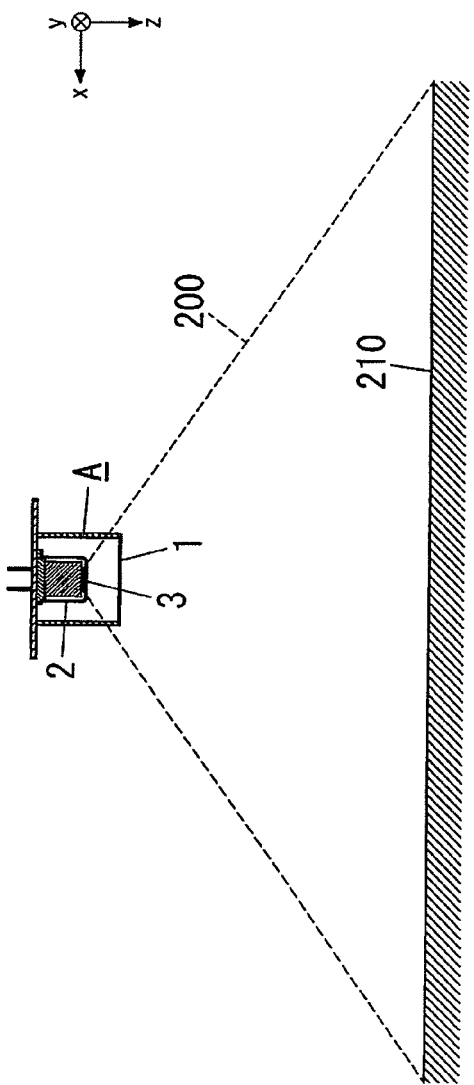
FIG. 7A is an explanatory diagram of the detection area of the optical detection device of the embodiment.
Figure 7B:
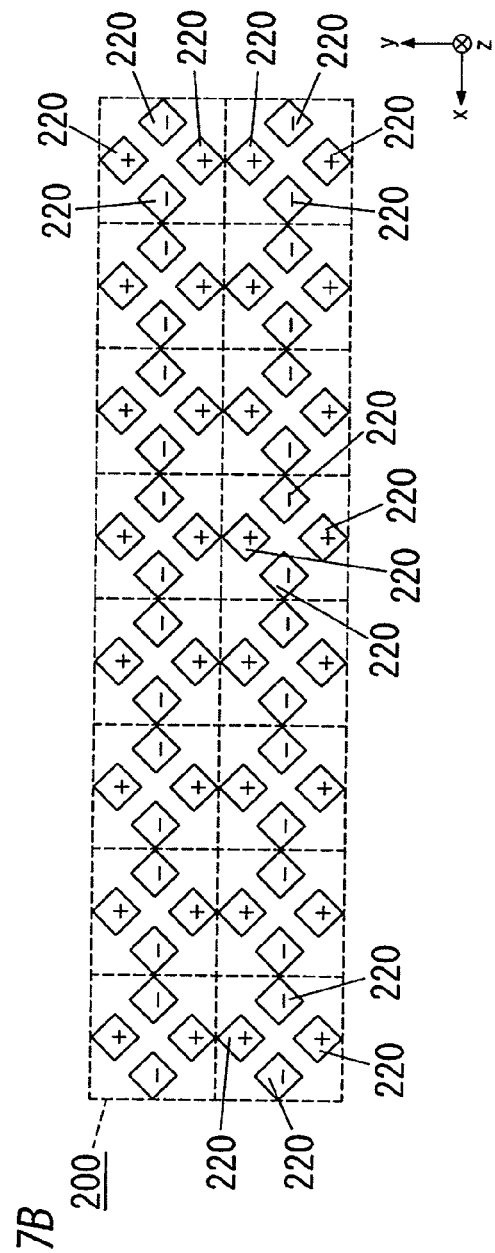
FIG. 7B is an explanatory diagram of the detection area of the optical detection device of the embodiment.
Figure 8:
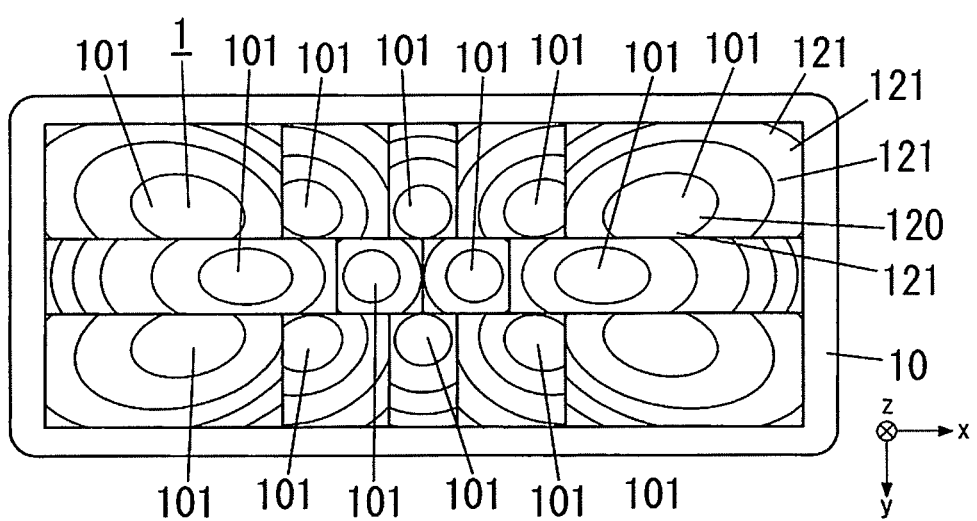
FIG. 8 is a schematic bottom plan view of a main section according to another configuration example of the optical detection device of the embodiment.
Figure 9A:
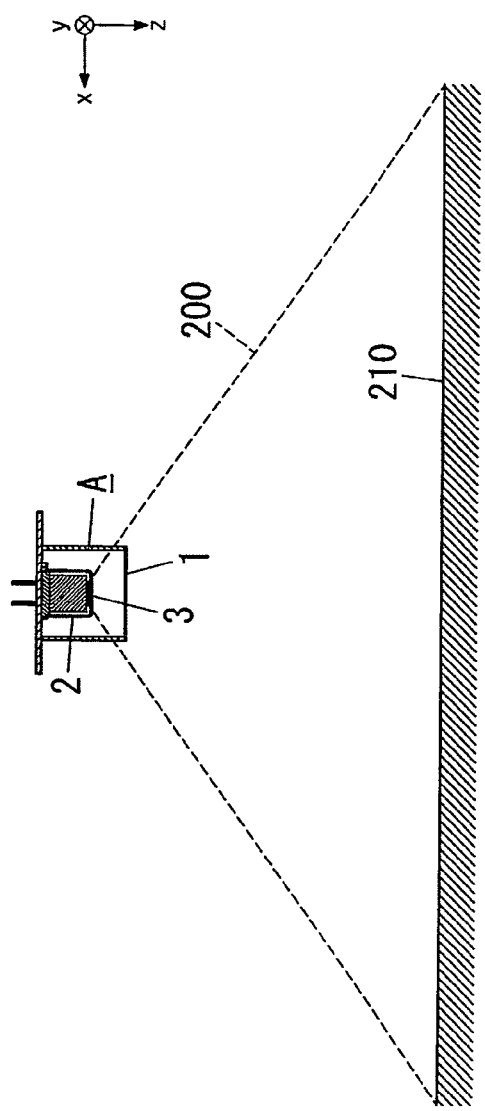
FIG. 9A is an explanatory diagram of a detection area according to said another configuration example of the optical detection device of the embodiment.
Figure 9B:
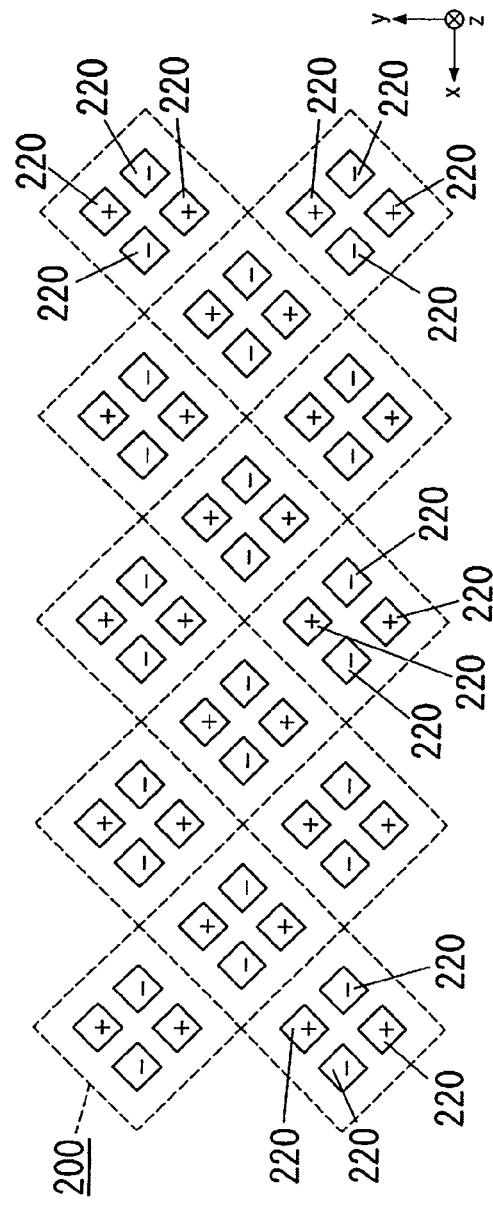
FIG. 9B is an explanatory diagram of the detection area according to said another configuration example of the optical detection device of the embodiment.

In this case, the infrared light receiving element 3 shown in FIG. 6B is rotated by 45 degrees in an XY plane, and hence the detection area 200 of the optical detection device A is set as shown in FIGS. 7A and 7B. In this case, therefore, a space between the adjacent two detection beams 220 formed by the different lenses 101, among the four detection beams 220 set for each of the adjacent lenses 101, can be reduced, and smaller motion of the object can be detected. In this case, the possibility that a human passes through the two detection beams 220 with different polarities, and that output of the device elements 31 is offset is reduced. When the infrared light receiving element 3 shown in FIG. 6B, described above, is rotated by 45 degrees in the XY plane, and the lenses 101 of the multi-segment lens 1 are arranged to be staggered as shown in FIG. 8, the detection area 200 of the optical detection device A is set as shown in FIGS. 9A and 9B, and the arrangement of a plurality of the detection beams 220 becomes staggered. Thus, the optical detection device A can detect the smaller motion of the object.

The multi-segment lens 1 shown in FIG. 8 includes a first lens group configured from five lenses 101 on an upper section, linearly arranged along a right-left direction (one direction), a second lens group adjacent to the first lens group and configured from four lenses 101 on a middle section, linearly arranged along the right-left direction (one direction) similarly, and a third lens group adjacent to the second lens group and configured from five lenses 101 on a lower section, linearly arranged along the right-left direction (one direction) similarly. Here, the lenses 101 of the second lens group are arranged to be staggered with respect to the lenses 101 of the first and third lens groups by adjusting right-left directional widths of two lenses 101 arranged on right and left both ends.

The infrared light receiving element 3 may be configured by arranging a plurality of the device elements 31, each of which is formed in a rectangle, in a short side direction of the device elements 31 in planar view. For example, the infrared light receiving element 3 may be configured by arranging the rectangular device elements 31 in the form of a 1*4 array. In this case, the detection area 200 of the optical detection device A is set as shown in FIGS. 10A and 10B, so that widths of the detection beams 220 in the right-left direction (horizontal direction), and spaces between the adjacent detection beams 220 can be reduced, and detection of the motion of the object radiating infrared light is facilitated.

Each lens 101 of the multi-segment lens 1 is a Fresnel lens, a first surface 110 is a plane surface, and a second surface 120, being the reverse side surface of the first surface 110, has a plurality of lens surfaces 121. In the present embodiment, in the light of the fact that an appearance surface on the periphery of the multi-segment lens 1 is often a plane surface or a curved surface with small curvature in an apparatus equipped with the optical detection device A, the plane surface is employed as the first surface 110. Thus, in the apparatus, the appearance surface on the periphery of the multi-segment lens 1 and an appearance surface of the multi-segment lens can be substantially flush with each other (have a continuous shape). Therefore, in the optical detection device according to the present embodiment, design of the apparatus equipped with the multi-segment lens can be inhibited from being damaged by the multi-segment lens, a human looking at the apparatus can be inhibited from having a feeling of strangeness on the appearance of the apparatus due to the multi-segment lens, and the apparatus equipped with the multi-segment lens can have beautiful appearance.

Figure 4A:
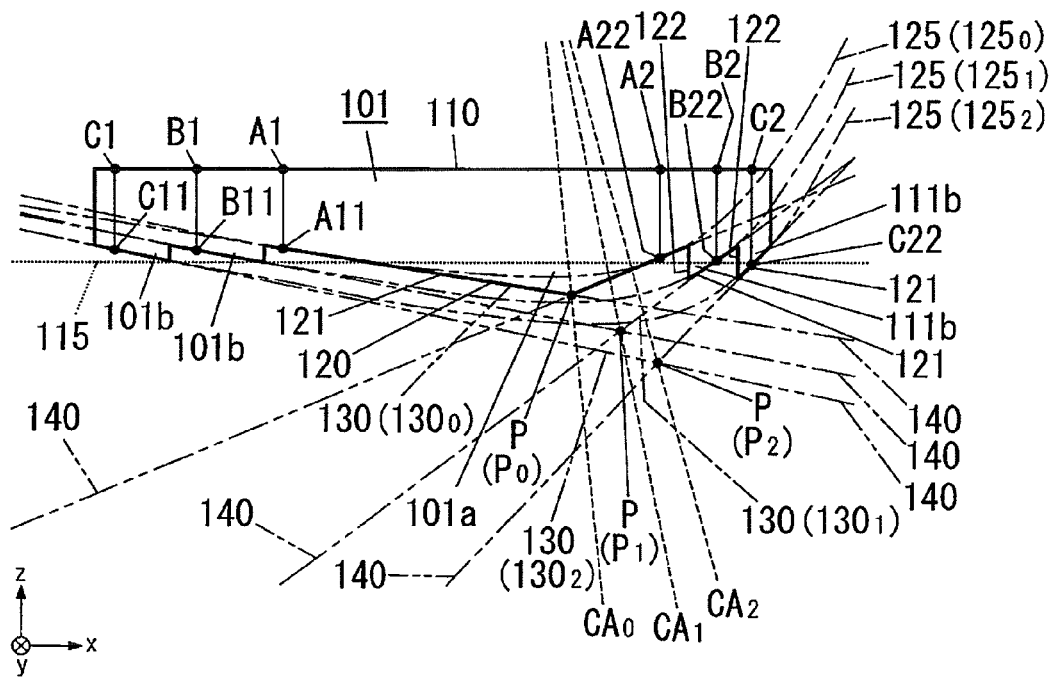
FIG. 4A is a cross-sectional view of a main section of a multi-segment lens of the optical detection device of the embodiment.

As shown in FIG. 4A, the lens 101 has a central lens portion 101a, a plurality of (two in an example shown in the figure) orbicular zone-shaped lens portions 101b surrounding the central lens portion 101a. The number of the orbicular zone-shaped lens portions 101b is not particularly limited, and three or more orbicular zone-shaped lens portions may be employed. The lens 101 is a condenser lens in which the second surface 120, being the reverse side surface of the first surface 110, has a plurality of the lens surfaces 121, and a lens surface 121 of the central lens portion 101a is a convex surface. In short, the lens 101 is a condenser lens capable of reducing a thickness as compared with a thickness of a convex lens.

Each orbicular zone-shaped lens portion 101b has a mountain portion 111b on the second surface 120 side. Each mountain portion 111b has a rising surface (non-lens surface) 122 configured from a side surface on the central lens portion 101a, and the lens surface 121 configured from a side surface on a side opposite to the central lens portion 101a side. Therefore, the second surface 120 of the lens 101 has the lens surfaces 121 of the respective orbicular zone-shaped lens portions 101b. Further, the second surface 120 of the lens 101 also has the lens surface 121 of the central lens portion 101a.

In a general aspheric lens, when the lens surface is represented by an aspheric surface Formula, the following Formula (4) is obtained. However, in Formula (4), a single plane surface orthogonal to an optical axis is defined as an XY plane, an intersection of the XY plane and the optical axis is defined as an origin, a distance from the origin in the XY plane is defined as r, a distance from the XY plane in an optical axis direction is defined as z, a conic constant is defined as k, curvature of the intersection of the lens surface and the optical axis is defined as c, and a2 to am are correction coefficients.

[Math. 4]

$$z = c\frac{r^2}{1+\sqrt{1-(k+1)c^2r^2}} + a_2r^4 + a_3r^6 + \ldots + a_mr^{2m} \qquad \text{Formula (4)}$$

In Formula (4), a first term represents a rotation second curved surface, and the lens surface becomes a hyperboloid in a case of k<−1. Therefore, when utilizing Formula (4), it is possible to design a hyperboloid 125 in which a rotation axis is inclined by an angle θ with respect to a normal line of the first surface 110, and infrared light incident at an angle δ can be aplanatically collected on the focal position F by configuring the lens surfaces 121 from parts of such hyperboloids 125.

When S denotes an area of the first surface 110 of the lens 101, in the lens 101 having the lens surfaces 121 configured from the parts of the hyperboloids 125 in which the rotation axis is inclined by the angle θ with respect to the normal line of the first surface 110, described above, assuming that PW denotes incident power of infrared light incident from the detection surface 210, the incident power PW is represented by the following Formula (5), where K in Formula (5) is a proportionality constant.

[Math. 5]

$$PW = K \cdot S \cdot \cos^4\theta \qquad \text{Formula (5)}$$

Therefore, when the area S of the first surface 110 of the lens 101 is constant, the larger the angle θ of the lens 101 is, the smaller the incident power of infrared light is. The multi-segment lens 1 is preferably set so that the larger the angle θ of the lens 101, the larger the area S of the first surface 110 of the lens 101 is. In this case, the further the lens 101 is separated from a center of the multi-segment lens 1, the larger the area S of the first surface 110 is, while the further the lens 101 is separated from the center of the multi-segment lens 1, the larger the area of the second surface 120 is.

In the multi-segment lens 1, polyethylene that is resin transmitting infrared light is adopted as a lens material. However, in the multi-segment lens 1, the Fresnel lens is employed as each lens 101, so that difference between maximum and minimum thicknesses Δt (see FIG. 4B) can be reduced while increasing the lens area of the second surface 120 of each lens 101. Then, in the multi-segment lens 1, a light pass length of infrared light incident from a direction oblique to the normal line of the first surface 110 (direction not to perpendicular to the first surface 110) can be shortened, and transmittance can be improved.

Although silicon, germanium, and the like are cited as materials transmitting infrared light, it is difficult to mass-produce the complicated shaped multi-segment lens 1 from these crystalline materials. On the other hand, polyethylene is a material transmitting infrared light, and further can transfer a complicated shape of a metal mold by injection molding, and hence the multi-segment lens 1 can be mass-produced.

However, in a case where each of the lens surfaces 121 is configured from a part of the hyperboloid 125 and the rotation axis of the hyperboloid 125 is oblique to the normal line of the first surface 110, each lens surface 121 is not rotationally symmetric with respect to the normal line of the first surface 110. Therefore, it is difficult to produce the multi-segment lens 1 or the metal mold for the multi-segment lens 1 by rotary forming with a lathe or the like.

Figure 4B:
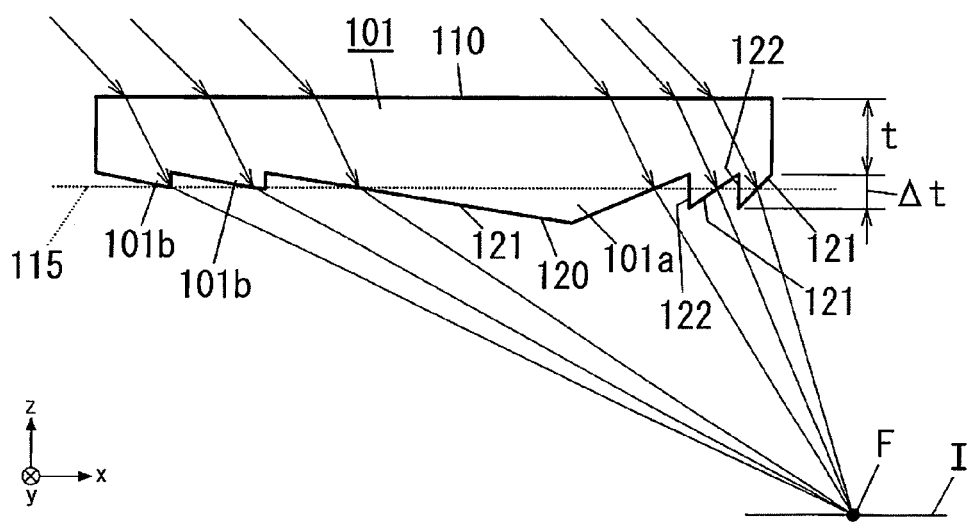
FIG. 4B is an explanatory diagram of a traveling path of infrared light of the multi-segment lens of the optical detection device of the embodiment.
Figure 5:
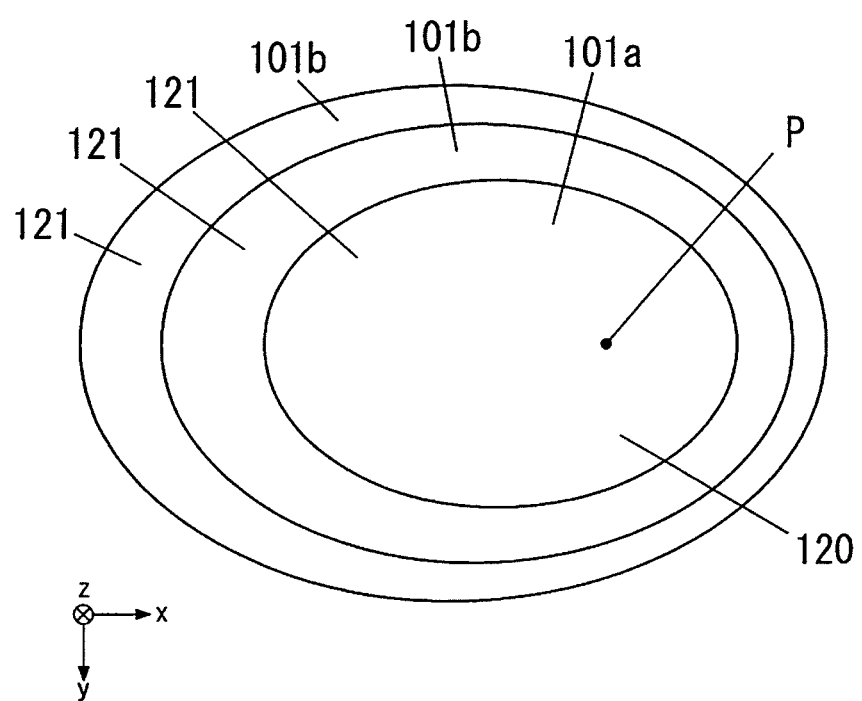
FIG. 5 is a plan view of a single lens of the multi-segment lens of the optical detection device of the embodiment.

On the other hand, in each lens 101 of the multi-segment lens 1 according to the present embodiment, as shown in FIGS. 4A and 4B and FIG. 5, for example, each of the lens surfaces 121 of each lens 101 is configured from a part of a side surface of an elliptical cone 130. Then, any normal line intersecting with each lens surface 121 configured from the part of the side surface of an elliptical cone 130, among the normal lines of respective points on the first surface 110, is non-parallel (that is, inclined) to a central axis of the elliptical cone 130 corresponding to the lens surfaces 121 with which the any normal line intersects. Here, each elliptical cone 130 has an apex P located on the second surface 120 side and a bottom surface (not shown) located on the first surface 110 side. In the lens 101 of the multi-segment lens 1 having a structure shown in FIGS. 4A and 4B and FIG. 5, the first surface 110 is the plane surface, and hence the central axes of the elliptical cones 130 are oblique to the normal lines of the respective points on the first surface 110. In a case where such a direction as to connect each point on the first surface 110 and an intersection at which the normal line of the point interests with the lens surface 121 is specified as a lens thickness direction, when the first surface 110 is the plane surface, a direction along the normal line of each point on the first surface 110 is the lens thickness direction. Therefore, in each of FIGS. 4A and 4B, a vertical direction is the lens thickness direction. Accordingly, in each lens 101, each lens surface 121 is preferably configured from the part of the side surface of the corresponding elliptical cone 130 that has the apex P located on the second surface 120 side, the bottom surface (not shown) located on the first surface 110 side, and the central axis (not shown) oblique to the lens thickness direction. In a cross-sectional shape including the normal lines of the first surface 110, an angle formed by a surface parallel to the first surface 110 and each lens surface 121 is an obtuse angle, and an angle formed by the surface parallel to the first surface 110 and each rising surface 122 is a substantially right angle.

Hereinafter, the lens 101, in which the respective lens surfaces 121 are configured from the parts of the side surfaces of the elliptical cones 130, as shown in FIGS. 4A and 4B and FIG. 5, will be described.

In order to solve the problem, that is, to provide an optical detection device capable of suppressing occurrence of off-axis aberration of each lens 101 utilizing incident light (infrared light) obliquely incident upon the first surfaces 110 from the outside world, suppressing reduction of sensitivity, and reducing the cost, while enhancing the appearance of the multi-segment lens 1, the present inventors have conceived as follows: That is, as to a standard structure in which the second surface 120 is configured from the respective parts of a plurality of the hyperboloids (one sheet of hyperboloid of two sheets) 125 having the rotation axis (principal axis) oblique to the normal lines of the first surface 110, the present inventors have conceived that in the cross-sectional shape including the normal lines of the first surface 110, the aforementioned respective parts of the plurality of hyperboloids 125 are approximated by straight lines.

In each hyperboloid 125, collection of tangents of respective points on a cross-section orthogonal to the rotation axis of the hyperboloid 125 becomes a circular cone. Therefore, in a Fresnel lens configured such that each lens surface of the emission surface is rotationally symmetric employing the normal line of the incident surface as a rotation axis, each lens surface can be approximated by the part of the side surface of the circular cone.

In a rectangular coordinate system, in which a center of any plane surface is employed as an origin, an x-axis and a y-axis orthogonal to each other on the any plane surface are specified, and a z-axis orthogonal to the any plane surface is specified, assuming that (x, y, z) denote coordinates of any points of the circular cone, and b and c denote coefficients, the equation of the circular cone is represented by the following standard form, where the coefficient c is a constant irrelevant to z.

[Math. 6]

$$\frac{x^2+y^2}{b^2} - \frac{z^2}{c^2} = 0 \ (b, c > 0)$$ Formula (6)

In a frustum of cone configured by cutting this circular cone by two surfaces parallel to an xy plane surface, the aforementioned parts of the respective hyperboloids 125 in the above-mentioned standard structure cannot be approximated.

On the other hand, in each hyperboloid 125, collection of tangents 140 of respective points on a cross-section not perpendicular to the rotation axis of the hyperboloid 125 becomes an elliptical cone. Here, the present inventors have focused on the fact that in the hyperboloids 125 having the above-mentioned structure of FIG. 4A can be approximated by the elliptical cones 130 coming in contact with the hyperboloids 125 on the respective points on the lines of intersection of the plane surfaces oblique to the principal axes of the hyperboloids 125 and the hyperboloids 125. Then, the present inventors have conceived that the lens surfaces 121 are configured from the parts of the side surfaces of the elliptical cones 130 that have apexes P located on the second surface 120 side, the bottom surfaces (not shown) located on the first surface 110 side, and the central axes (not shown) oblique to the normal lines of the first surface 110.

In the lens 101 of the multi-segment lens 1 shown in FIGS. 4A and 4B and FIG. 5, when focusing on the lens surfaces 121 configured from the parts of the respective elliptical cones 130, since the elliptical cones 130 have the hyperboloids 125 inscribed in the elliptical cones 130, and inclinations of both of the tangents of the respective points on the lines of intersection of the elliptical cones 130 and the hyperboloids 125 coincide with each other, light beams passing through the respective points on the lines of intersection of the elliptical cones 130 and the hyperboloids 125 are collected on a single point on the rotation axis of the hyperboloids 125. In this lens 101, at least one of the plurality of lens surfaces 121 is configured so as to have a shape in which a part of the elliptical cone 130 is cut off so as to include the line of intersection of the elliptical cone 130 and the hyperboloid 125, thereby being capable of suppressing occurrence of off-axis aberrations in a case of utilizing incident light obliquely incident upon the first surfaces 110 from the outside world and reducing the cost. Here, in the lens 101, the lower a height of the mountain portion 111b is, the more easily light beams passing through this mountain portion 111b are collected on a single point, and hence the line of intersection of the elliptical cone 130 and the hyperboloid 125 inscribed in the elliptical cone 130 is preferably intersect with the mountain portion 111b.

The height of each mountain portion 111b and a space between the apexes of the adjacent mountain portions 111b need to be set at a value which is more than or equal to a wavelength of an electromagnetic wave that is an object to be collected in the lens 101. For example, in a case where infrared light with a wavelength of 10 μm is an object to be collected, the height of each mountain portion 111b and the space between the apexes of the adjacent mountain portions 111b need to be 10 μm or more. On the other hand, in the lens 101, it is conceivable to cause a problem that the larger the height of each mountain portion 111b and the space between the apexes of the adjacent mountain portions 111b are, the larger the off-axis aberrations are, and a problem that lens patterns can be visually recognized from the first surface 110 side. Therefore, in a case where an allowable value (target value) of an off-axis aberration is, for example, less than or equal to 0.6*0.6 mm which is the size of the infrared light receiving element 3 arranged on the focal point F, the lens 101 is preferably configured such that a maximum height of the mountain portion 111 is 150 μm or less. In addition, in a case where it is required that the lens patterns on the second surface 120 side is unable to be visually recognized when unintentionally viewed from a place separated from the first surface 110 by 30 cm, the lens 101 is preferably configured such that the space between the adjacent mountain portions 111b is 0.3 mm or less. On the other hand, the smaller the space between the adjacent mountain portions 111b is, the larger the number of the mountain portions 111b is, and hence the space between the adjacent mountain portions 111b is preferably set in a range of, for example, 0.1 to 0.3 mm.

In the lens 101 according to the present embodiment, the lines of intersection of the elliptical cones 130 and the hyperboloids 125 inscribed in the elliptical cones 130 exist on a plane surface 115 which is orthogonal to the lens thickness direction (that is, parallel to the first surface 110 configured from the plane surface), and which has a height from a valley of the mountain portion 111b of each orbicular zone-shaped lens portion 101b that is a half of the maximum height of the mountain portion 111b. Therefore, in this lens 101, infrared light (light beams) passing on the intersections of the lens surfaces 121 and the plane surface 115 is collected on the focal point F, as shown in FIG. 4B.

In a rectangular coordinate system, in which a center of any plane surface is employed as an origin, an x-axis and a y-axis orthogonal to each other on the any plane surface are specified, and a z-axis orthogonal to the any plane surface is specified, assuming that (x, y, z) denote coordinates of any points of the elliptical cone, and a, b and c denote coefficients, the general equation of the elliptical cone is represented by the standard form of following Formula (7), where the coefficient c is a constant irrelevant to z.

[Math. 7]

$$\frac{x^2}{a^2} + \frac{y^2}{b^2} - \frac{z^2}{c^2} = 0 \; (a \neq b \text{ and } a, b, c > 0) \quad \text{Formula (7)}$$

Hereinafter, for convenience of description, the lens 101 in FIG. 4A will be described by denoting the three elliptical cones 130 with different reference numerals, respectively. The elliptical cone corresponding to the central lens surface 121 is represented as an elliptical cone $130_0$, the elliptical cone corresponding to the lens surface 121 that is a first orbicular zone closest to the central lens surface 121 is represented as an elliptical cone $130_1$, and the elliptical cone corresponding to the lens surface 121 that is a second orbicular zone second closest to the central lens surface 121 is represented as an elliptical cone $130_2$. In short, among the elliptical cones 130 except the elliptical cone 130 corresponding to the central lens surface 121, the elliptical cone corresponding to the lens surface 121 that is an m-th (m>=1) orbicular zone counting from a side closer to the central lens surface 121 is represented as an elliptical cone $130_m$. Here, the respective apexes P of the elliptical cones $130_0$, $130_1$ and $130_2$ are represented as apexes $P_0$, $P_1$ and $P_2$, and the respective central axes of the elliptical cones $130_0$, $130_1$ and $130_2$ are denoted by $CA_0$, $CA_1$, and $CA_2$. In short, the apex of the elliptical cone $130_m$ corresponding to the lens surface 121 that is the m-th orbicular zone is denoted by $P_m$, and the central axis of the elliptical cone $130_m$ is denoted by $CA_m$. As to the elliptical cones $130_0$, $130_1$ and $130_2$, rectangular coordinate systems, in which the apexes $P_0$, $P_1$ and $P_2$ are employed as origins, the central axes $CA_0$, $CA_1$ and $CA_2$ are employed as z-axes, x-axes are specified along major axis directions of ellipses in cross-section perpendicular to the z-axis, and y-axes are specified along minor axis directions, are defined. Then, a Formula of each of the elliptical cones $130_0$, $130_1$ and $130_2$ can be represented by the above-mentioned Formula (7) in each rectangular coordinate system. Further, in FIG. 4A, the hyperboloids 125 inscribed in the elliptical cones $130_0$, $130_1$ and $130_2$ are represented by hyperboloid $125_0$, $125_1$ and $125_2$, respectively.

As an example of the lens 101 being a Fresnel lens, a lens including six lens surfaces 121 each configured from a part of a side surface of an elliptical cone 130 is exemplified. In this lens 101, among the six elliptical cones 130, the elliptical cone corresponding to the central lens surface 121 is represented as an elliptical cone $130_0$, and the elliptical cones corresponding to the lens surfaces 121 that are a first orbicular zone to a fifth orbicular zone are represented as elliptical cone $130_1$ to $130_5$, respectively. In the lens 101 of this example, in a case where a thickness t of a base portion configured from a portion other than each mountain portion 111b is 0.5 mm, a height (lens step) Δt of the mountain portion 111b on a point closest to a focal point F in each orbicular zone-shaped lens portion 101b is 0.05 mm, and polyethylene with a refractive index of 1.53 is employed as a lens material, values of coefficients a, b and c in Formula (7) are shown in the following Table 1. However, the coefficients a, b and c shown in Table 1 are values obtained under a precondition that a distance from an image surface I parallel to the first surface 110 of the lens 101 to the first surface 110 is 5.5 mm, and infrared light (light beams) incident at an incident angle of 45 degrees is collected on the focal point F.

TABLE 1

| Lens Surface | Coefficient a | Coefficient b | Coefficient c |
| --- | --- | --- | --- |
| Elliptical Cone $130_0$ | 46.28 | 32.81 | 1.71 |
| Elliptical Cone $130_1$ | 19.29 | 13.83 | 1.72 |
| Elliptical Cone $130_2$ | 12.67 | 9.24 | 1.73 |
| Elliptical Cone $130_3$ | 10.11 | 7.49 | 1.74 |
| Elliptical Cone $130_4$ | 8.66 | 6.50 | 1.75 |
| Elliptical Cone $130_5$ | 7.68 | 5.85 | 1.76 |

The central axes of the lens surfaces 121 of the second surface 120 with which the normal lines intersect are inclined with respect to the normal lines of the respective points on the first surface 110. Hereinafter, for convenience of description, in the lens 101 in FIG. 4A, the intersections of the respective normal lines of points A1, A2, B1, B2, C1 and C2 on the first surface 110 and the second surface 120 are referred to as A11, A22, B11, B22, C11 and C22, and the respective normal line of the points A1, A2, B1, B2, C1 and C2 on the first surface 110 are referred to as A1-A11, A2-A22, B1-B11, B2-B22, C1-C11 and C2-C22. Here, $\theta_0$ denotes an angle formed by each of the normal lines A1-A11 and A2-A22 intersecting with the central lens surface 121, and the central axis $CA_0$ of the elliptical cone $130_0$, $\theta_1$ denotes an angle formed by each of the normal lines B1-B11 and B2-B22 intersecting with the lens surface 121 which is the first orbicular zone closest to the central lens surface 121, and the central axis $CA_1$ of the elliptical cone $130_1$, and $\theta_2$ denotes an angle formed by each of the normal lines C1-C11 and C2-C22 intersecting with the lens surface 121 which is the second orbicular zone second closest to the central lens surface 121, and the central axis $CA_2$ of the elliptical cone $130_2$. Similarly, assuming that $\theta_3$ denotes an angle formed by the normal line intersecting with the lens surface 121 which is the third orbicular zone, and the central axis $CA_3$ of the elliptical cone $130_3$, $\theta_4$ denotes an angle formed by the normal line intersecting with the lens surface 121 which is the fourth orbicular zone, and the central axis $CA_4$ of the elliptical cone $130_4$, and $\theta_5$ denotes an angle formed by the normal line intersecting with the lens surface 121, which is the fifth orbicular zone, and the central axis $CA_5$ of the elliptical cone $130_5$, values of $\theta_0$ to $\theta_5$ are shown in the following Table 2.

TABLE 2

| | |
|---|---|
| $\theta_0$ | 0.15° |
| $\theta_1$ | 0.84° |
| $\theta_2$ | 1.89° |
| $\theta_3$ | 2.89° |
| $\theta_4$ | 3.84° |
| $\theta_5$ | 4.75° |

It is understood from Table 2 that in the lens 101, the angle, which is formed by a normal line of each point on the first surface 110 and a central axis of a lens surface 121 of the second surface 120 with which the normal line intersects, becomes larger as a orbicular zone-shaped lens portion 101b is located further outside.

Figure 11:
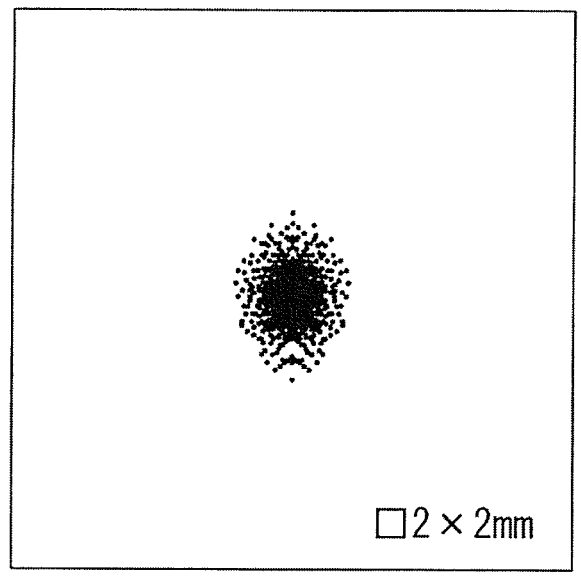
FIG. 11 is a spot diagram of the lens of the multi-segment lens of the optical detection device of the embodiment.

FIG. 11 shows a spot diagram on the focal point F of this lens 101. FIG. 11 shows a spot diagram in the range of 2*2 mm employing the focal point F as a center. The size of a focal spot should be less than or equal to the size of the infrared light receiving element 3 arranged so as to correspond to the focal point F of the lens 101 (here, 0.6*0.6 mm or less).

Figure 22:
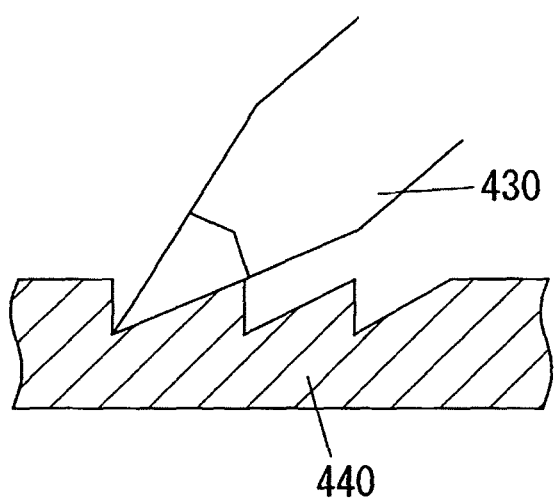
FIG. 22 is an explanatory diagram of a method of producing a Fresnel lens in a case where the cross-sectional shape of each lens surface on a second surface side of the Fresnel lens is linear.

In the lens 101 shown in FIGS. 4A and 4B and FIG. 5, in the cross-sectional shape including the normal lines of the first surface 110, the respective lens surfaces 121 are straight lines, and hence it is possible to form curved surfaces according to the lens surfaces 121 by cutting while a cutting tool 430 is inclined with respect to a workpiece 440 (base material for forming a metal mold) so as to bring a side surface of a blade into line contact with the workpiece 440, as shown in FIG. 22. Therefore, according to the present embodiment, when the metal mold for the multi-segment lens 1 is produced, the processing time for producing the workpiece by the cutting tool 430 can be reduced. The material of the metal mold is not particularly limited, and phosphor bronze or the like can be employed, for example.

The optical detection device A according to the present embodiment includes the multi-segment lens 1 configured by combining a plurality of the lenses 101 having the same focal position F, and the infrared light sensor 2 having the infrared light receiving element 3 arranged on the focal position F, as described above. In the optical detection device A according to the present embodiment, as to each lens 101 of the multi-segment lens 1, the first surface 110 is the plane surface, the second surface 120 has the plurality of lens surfaces 121, each lens surface 121 is configured from the part of the side surface of the elliptical cone 130 that has the apex P located on the second surface 120 side, the bottom surface located on the first surface 110 side, and the central axis oblique to the normal line of the first surface 110, as illustrated in FIG. 4A. In the lens 101 according to the present embodiment, any normal line intersecting with the lens surface 121 configured from the part of the side surface of the elliptical cone 130, among the respective normal lines on the first surface 110, is non-parallel to the central axis of the elliptical cone 130 corresponding to the lens surface 121 with the any normal line. Then, in the lens 101 according to the present embodiment, it is possible to suppress an off-axis aberration of the lens 101 in a case of utilizing incident light obliquely incident upon the first surface 110 from the outside world, and reduce the cost. Then, in the optical detection device A according to the present embodiment, the lens patterns formed on the second surface 120 sides of the respective lenses 101 of the multi-segment lens 1 are made difficult to be visually recognized from the first surface 110 sides of the respective lenses 101, thereby being capable of suppressing occurrence of off-axis aberrations of the lenses 101 utilizing incident light obliquely incident upon the first surfaces 110 from the outside world, suppressing reduction of sensitivity, and reducing the cost, while enhancing the appearance of the multi-segment lens 1.

As described above, in the multi-segment lens 1, all of the plurality of lens surfaces 121 of the lens 101 can be configured from the parts of the elliptical cones 130. However, in a case where all of the plurality of lens surfaces 121 of the lens 101 is configured from the parts of the elliptical cones 130, the lens surface 121 of the central lens portion 101a includes the apex P of the elliptical cone 130, and the curved surface on this apex P becomes discontinuous, and hence infrared light passing through the apex P is not collected on the focal position F.

Figure 12A:
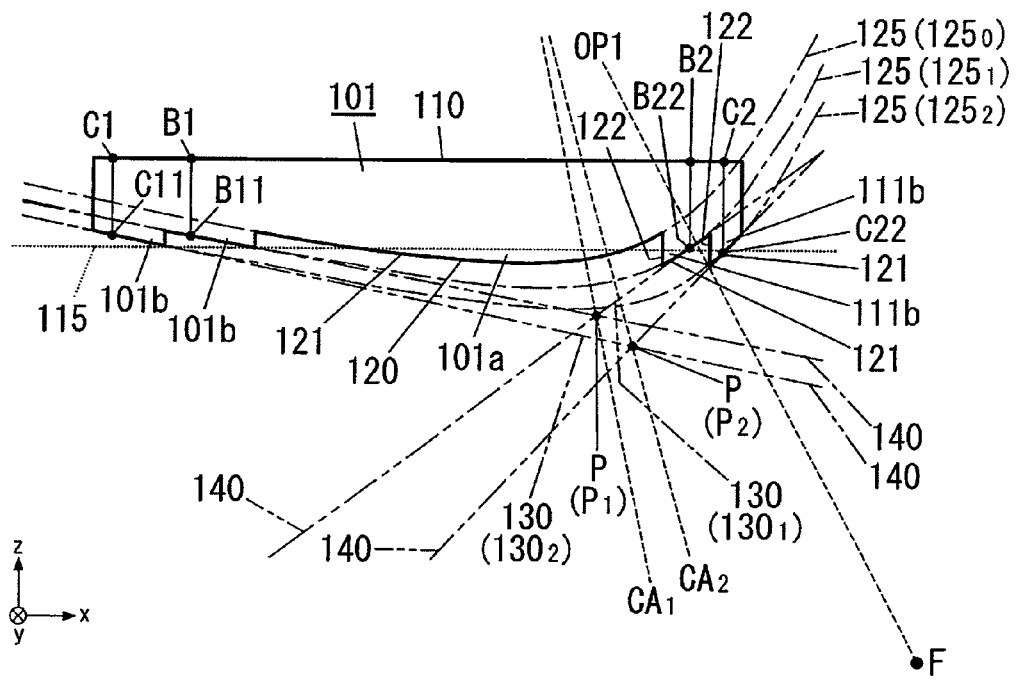
FIG. 12A is a cross-sectional view of a main section according to another configuration example of the multi-segment lens of the optical detection device of the embodiment.
Figure 12B:
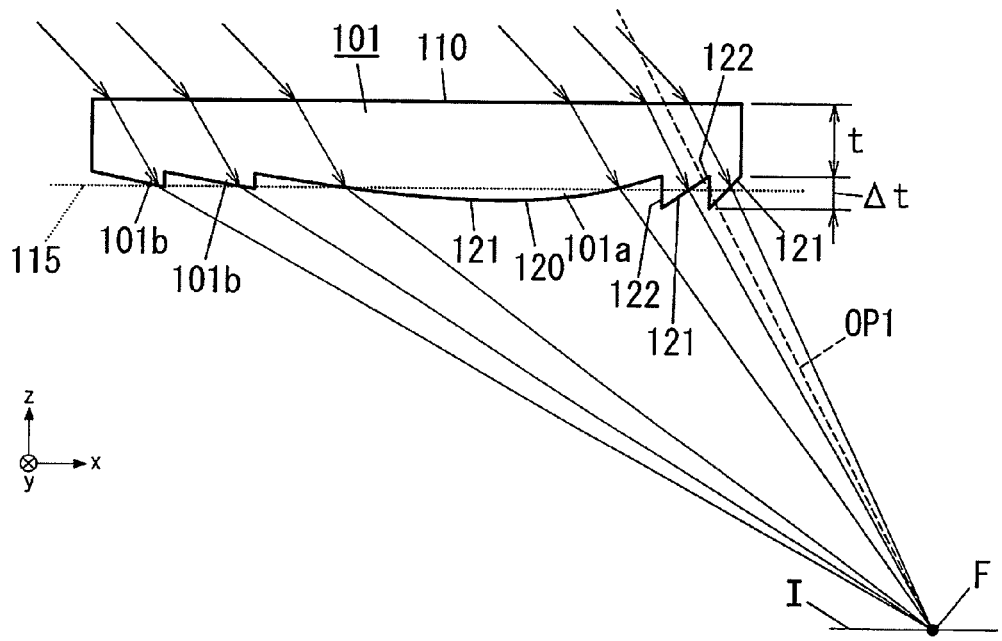
FIG. 12B is an explanatory diagram of a traveling path of infrared light according to said another configuration example of the multi-segment lens of the optical detection device of the embodiment.
Figure 13:
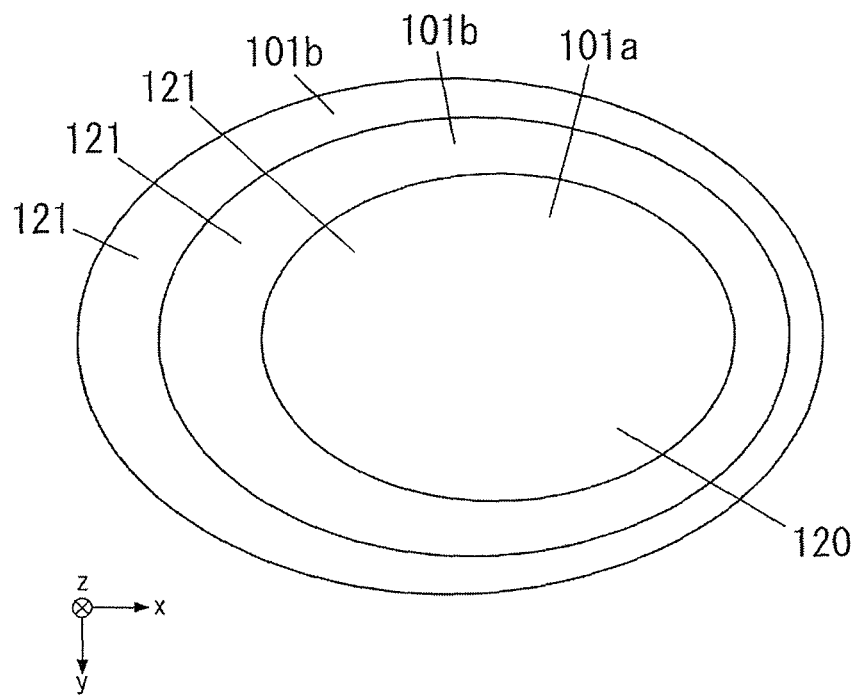
FIG. 13 is a plan view of a main section according to said another configuration example of the multi-segment lens of the optical detection device of the embodiment.
Figure 21:
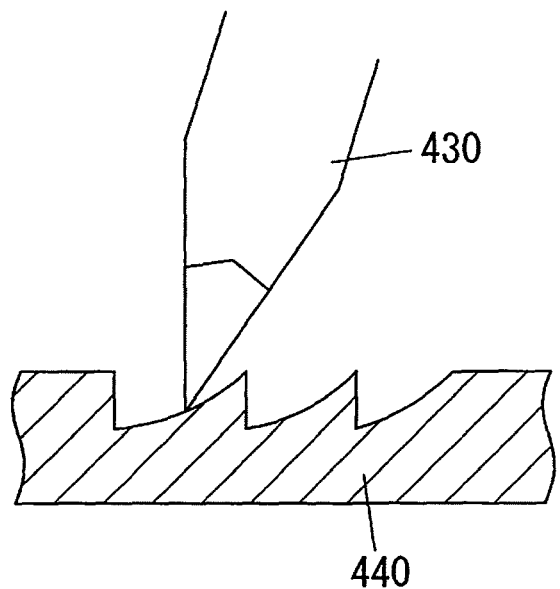
FIG. 21 is an explanatory diagram of a method of producing a Fresnel lens in a case where each lens surface on a second surface side of the Fresnel lens is a hyperboloid.

The central lens surface 121 among the plurality of lens surfaces 121 of each lens 101 of the multi-segment lens 1, that is, the lens surface 121 of the central lens portion 101a is preferably, for example, a part of an aspheric surface, in which an axis of symmetry is oblique to the normal line of the first surface 110 and curvature is continuously changed, and more preferably a part of the hyperboloid 125, in which a rotation axis OP1 is oblique to the normal line of the first surface 110, as shown in FIGS. 12A and 12B and FIG. 13. Therefore, in the multi-segment lens 1, focusing performance can be improved as compared with a case where the lens surfaces 121 of the central lens portions 101a are configured from the parts of the side surfaces of the elliptical cones 130. In short, in each lens 101 of the multi-segment lens 1, the central lens surface 121 among the plurality of lens surfaces 121 is preferably configured from the part of the aspheric surface with the continuously changing curvature, and any normal line intersecting with the central lens surface 121 configured from the part of the aspheric surface, among the normal lines of the respective points on the first surface 110, is preferably non-parallel (that is, inclined) to the axis of symmetry (the rotation axis OP1 of the hyperboloid 125 in the case where the aspheric surface is the hyperboloid 125) of the aspheric surface corresponding to the central lens surface 121 with which the any normal line intersects. This can improve focusing performance. Here, in each lens 101 of the multi-segment lens 1, the axis of symmetry of the aspheric surface should be non-parallel to the normal lines of the respective points on a projection region on the first surface 110 when projecting the central lens surface 121 in a direction parallel to the central axis of the first surface 110. Here, in a case where the lens surface 121 of the central lens portion 101a is configured by the part of the hyperboloid 125, there are the advantages of easily designing and processing, which is more desirable. In a case where the lens surfaces 121 of the central lens portions 101a are the parts of the hyperboloids 125, when the metal mold for the multi-segment lens 1 is produced, processing can be performed by reciprocating the cutting tool 430 (see FIG. 21 and FIG. 22) while inclining a cutting face perpendicular to the curved surfaces according to the lens surfaces 121. In this case, the processing is performed as far as a nose radius of the cutting tool 430 is smaller than the curvature radius of each hyperboloid 125, and hence the processing time can be reduced even when the lens surfaces 121 of the central lens portions 101a are the parts of the hyperboloids 125.

The lens 101 of the example shown in FIGS. 12A and 12B and FIG. 13 is preferably configured such that lines of intersection of the elliptical cones 130 and the hyperboloids 125 inscribed in the elliptical cones 130 intersect with the mountain portions 111b, similarly to the lens 101 of the example shown in FIGS. 4A and 4B and FIG. 5. In the lens 101 in FIGS. 12A and 12B and FIG. 13, the lines of intersection of the elliptical cones 130 and the hyperboloids 125 inscribed in the elliptical cones 130 exist on a plane surface 115 which is orthogonal to the lens thickness direction (that is, parallel to the first surface 110 configured from the plane surface). In this case, a height from a valley of the mountain portion 111b of each orbicular zone-shaped lens portion 101b to the plane surface 115 is a half of the maximum height of the mountain portion 111b. Therefore, in this lens 101, infrared light (light beams) passing on the intersections of the lens surfaces 121 and the plane surface 115 is collected on the focal point F, as shown in FIG. 12B.

In the lens 101 in FIGS. 12A and 12B, assuming that a rectangular coordinate system, in which the focal point F is employed as an origin, the rotation axis OP1 of the hyperboloid 125 is employed as a z-axis, and x-axis and a y-axis are orthogonal to the z-axis, is defined, the hyperboloid 125 that becomes the lens surface 121 of the central lens portion 101a is represented by the following Formula (8).

[Math. 8]

$$\frac{(z-c)^2}{a^2} - \frac{x^2+y^2}{b^2} = 1 \qquad \text{Formula (8)}$$

In this case, assuming that n denotes an refractive index of a lens material, and f denotes a back focus of the central lens portion 101a, a, b and c of Formula (8) are obtained by the following Formula (9), Formula (10), and Formula (11), respectively.

[Math. 9]

$$a = \frac{f}{n+1} \qquad \text{Formula (9)}$$

$$b = \sqrt{\frac{n-1}{n+1}}\, f \qquad \text{Formula (10)}$$

$$c = \frac{n}{n+1} f \qquad \text{Formula (11)}$$

When the above-mentioned Formula (8) is transformed into an explicit function formula of z=g (x, y) (g denotes any function), the transformed formula coincides with a first term of the above-mentioned Formula (4). That is, when performing variable substitution as r2=x2+y2, and summarizing the relation of z and r, similarly to the case of Formula (4), Formula (8) can be transformed into a formula corresponding to the term of r2 (first term of right-hand side of Formula (4)) in the above-mentioned Formula (4). Accordingly, it is obvious that the term of r2 of Formula (4) and Formula (8) represent substantially the same relation.

Assuming that rectangular coordinate systems, in which the apexes $P_1$ and $P_2$ are employed as origins, the central axes $CA_1$ and $CA_2$ are employed as z-axes, x-axes are specified along major axis directions of ellipses in cross-sections orthogonal to the z-axes, and y-axes are specified along minor axis directions, and are defined, the elliptical cones $130_1$ and $130_2$ can be represented by the above-mentioned Formula (7).

As an example of the lens 101 which is the Fresnel lens, a lens including a central lens surface 121 configured from a part of a hyperboloid 125, and five lens surfaces 121 each configured from a part of a side surface of an elliptical cone 130 is exemplified. In the lens 101 of this example, the five elliptical cones 130 corresponding to the lens surfaces 121 that are a first orbicular zone to a fifth orbicular zone are represented as elliptical cones $130_1$ to $130_5$, respectively. In the lens 101 of this example, in a case where a thickness t of a base portion configured from a portion other than each mountain portion 111b is 0.5 mm, a height (lens step) Δt of the mountain portion 111b on a point closest to a focal point F in each orbicular zone-shaped lens portion 101b is 0.05 mm, and polyethylene with a refractive index of 1.53 is employed as a lens material, values of coefficients a, b and c in Formula (8) or (7) are shown in the following Table 3. When the value of the lens step Δt t is smaller, sink marks at the time of curing of polyethylene can be suppressed, that is, dent on the first surface 110 side can suppressed. As a result, reduction in the focusing performance of the lens 101 due to the sink marks can be prevented. Furthermore, appearance on the first surface 110 side is not seen to be awkward objectively, and hence the value of the lens step Δt is cited as 0.05 mm as an example among various values examined. Table 3 shows values of a, b and c in Formula (8) as to the hyperboloid 125, and shows values of a, b and c in Formula (7) as to the elliptical cone $130_1$ to $130_5$. However, the coefficients a, b and c shown in Table 3 are the values obtained under a precondition that a distance from an image surface I parallel to the first surface 110 of the lens 101 to the first surface 110 is 5.5 mm, and infrared light (light beams) incident at an incident angle of 45 degrees is collected on the focal point F.

TABLE 3

| Lens Surface | Coefficient a | Coefficient b | Coefficient c |
| --- | --- | --- | --- |
| Hyperboloid 125 | 2.40 | 2.78 | 3.67 |
| Elliptical Cone $130_1$ | 13.53 | 9.83 | 1.73 |
| Elliptical Cone $130_2$ | 10.54 | 7.78 | 1.74 |
| Elliptical Cone $130_3$ | 8.92 | 6.68 | 1.75 |
| Elliptical Cone $130_4$ | 7.87 | 5.97 | 1.76 |
| Elliptical Cone $130_5$ | 7.11 | 5.47 | 1.77 |

In a case where infrared light (light beams) incident at an incident angle of 45 degrees with respect to the first surface 110 is collected on the focal point F, an angle formed by the rotation axis OP1 of the hyperboloid 125 of the central lens portion 101a and the normal line of the first surface 110 should be 27.5 degrees according to Snell's law. That is, the rotation axis OP1 should be inclined by 27.5 degrees with respect to the normal line of the first surface 110. The central axes of the lens surfaces 121 of the second surface 120 intersecting with the normal lines are inclined with the normal lines of the respective points on the first surface 110. $\theta_1$ denotes an angle formed by each of the normal lines B1-B11 and B2-B22 intersecting with the lens surface 121 which is the first orbicular zone closest to the central lens surface 121, and the central axis $CA_1$ of the elliptical cone $130_1$, and $\theta_2$ denotes an angle formed by each of the normal lines C1-C11 and C2-C22 intersecting with the lens surface 121 which is the second orbicular zone second closest to the central lens surface 121, and the central axis $CA_2$ of the elliptical cone $130_2$. Similarly, assuming that $\theta_3$ denotes an angle formed by the normal line intersecting with the lens surface 121 which is the third orbicular zone, and the central axis $CA_3$ of the elliptical cone $130_3$, $\theta_4$ denotes an angle formed by the normal line intersecting with the lens surface 121 which is the fourth orbicular zone, and the central axis $CA_4$ of the elliptical cone $130_4$, and $\theta_5$ denotes an angle formed by the normal line intersecting with the lens surface 121 which is the fifth orbicular zone, and the central axis $CA_5$ of the elliptical cone $130_5$, values of $\theta_0$ to $\theta_5$ are shown in the following Table 4.

TABLE 4

| | |
|---|---|
| $\theta_1$ | 1.67° |
| $\theta_2$ | 2.68° |
| $\theta_3$ | 3.64° |
| $\theta_4$ | 4.56° |
| $\theta_5$ | 5.43° |

It is understood from Table 4 that in each lens 101 of the multi-segment lens 1, the angle, which is formed by a normal line of each point on the first surface 110 and a central axis of each lens surface 121 of the second surface 120 with which the normal line intersects, becomes larger as a orbicular zone-shaped lens portion 101b is located further outside.

Figure 14:
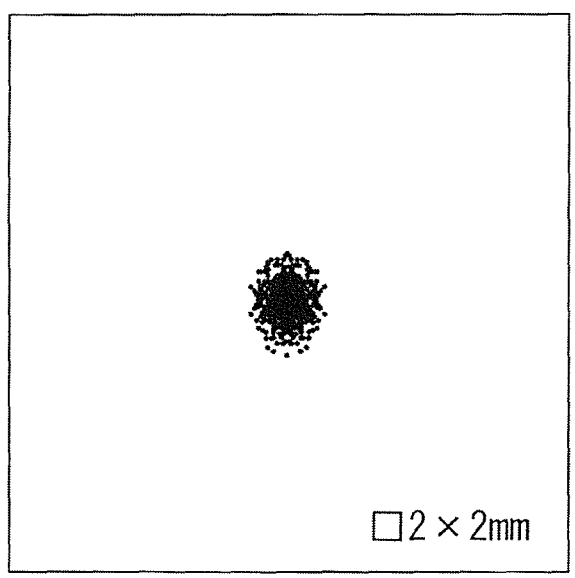
FIG. 14 is a spot diagram of a lens according to said another configuration example of the multi-segment lens of the optical detection device of the embodiment.

FIG. 14 shows a spot diagram of the focal point F of this lens 101. FIG. 14 shows a spot diagram in the range of 2*2 mm employing the focal point F as a center. The size of a focal spot should be less than or equal to the size of the infrared light receiving element 3 arranged so as to correspond to the focal point F of the lens 101 (here, 0.6*0.6 mm or less). When comparing FIG. 11 with FIG. 14, it is understood that the aberration of the lens 101 in FIGS. 12A and 12B can be reduced as compared with the lens 101 in FIGS. 4A and 4B.

In each lens 101 of the multi-segment lens 1, the lens surface 121 of at least one orbicular zone-shaped portion 101b among a plurality of the orbicular zone-shaped lens portions 101b is configured from the part of the side surface of the elliptical cone 130, thereby being capable of suppressing occurrence of off-axis aberration in a case of utilizing incident light obliquely incident upon the first surface 110 from the outside world, and reducing the cost.

Figure 15A:
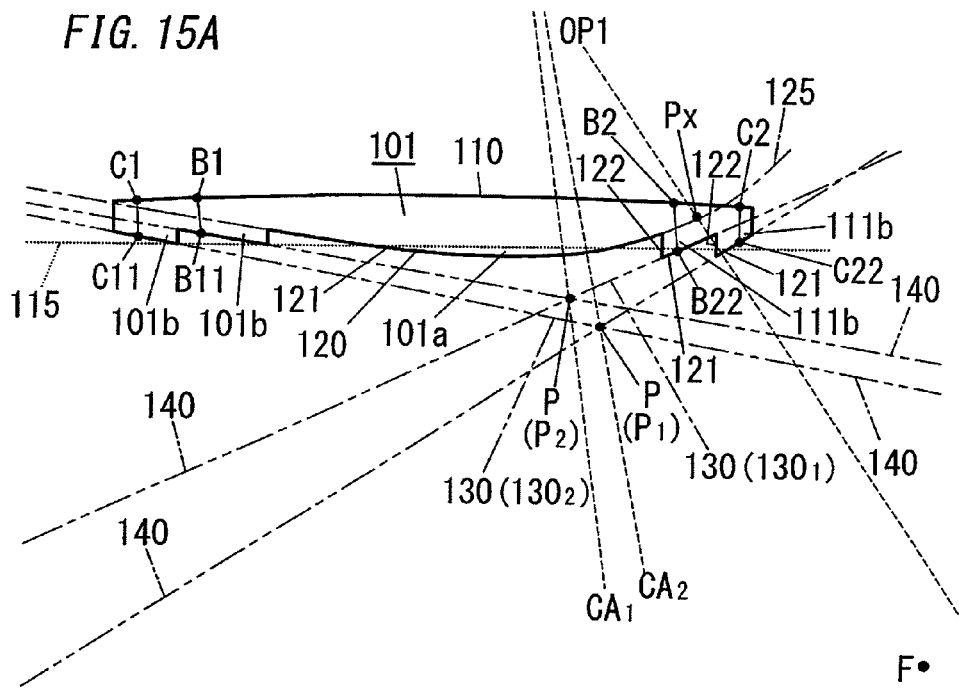
FIG. 15A is a cross-sectional view of a main section according to yet another configuration example of the multi-segment lens of the optical detection device of the embodiment.
Figure 15B:
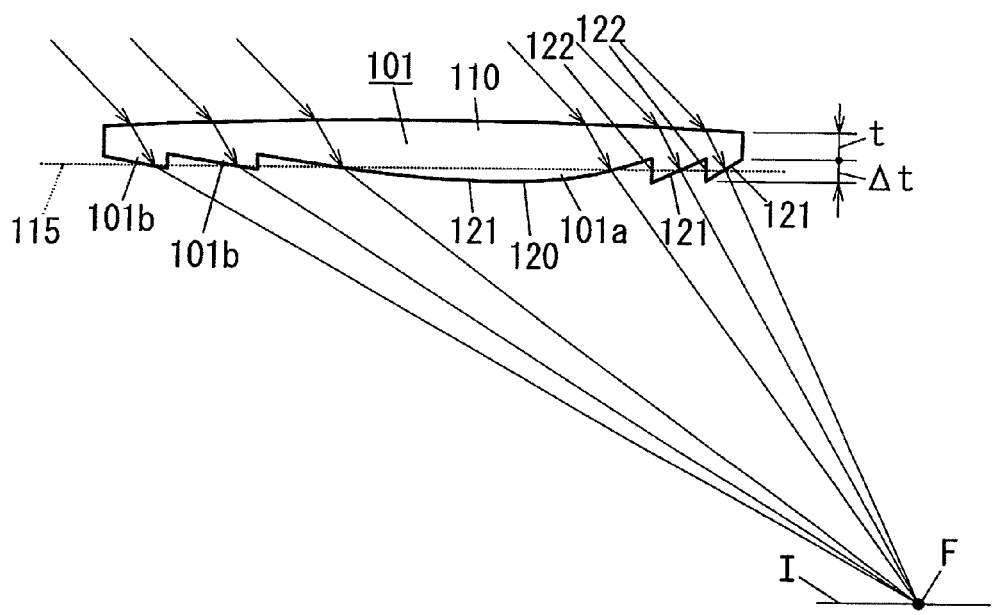
FIG. 15B is an explanatory diagram of a traveling path of infrared light according to said yet another configuration example of the multi-segment lens of the optical detection device of the embodiment.

The lens 101 of the multi-segment lens 1 is substantially the same as that of the above-mentioned example shown in FIGS. 12A and 12B and FIG. 13, and a lens, in which the first surface 110 is configured to be a curved surface that is convex toward a side opposite to the second surface 120, can be employed as shown in FIGS. 15A and 15B. In FIGS. 15A and 15B, the first surface 110 is a part of a spherical surface with a large curvature radius, but not limited to the part of the spherical surface.

In the multi-segment lens 1 including the lenses 101 shown in FIGS. 12A and 12B and FIG. 13, in a case where polyethylene is employed as a lens material, the first surfaces 110 are the plane surfaces, and hence sink marks or waviness occur due to cooling of the injection molding, shrinkage unevenness caused during a solidification process, or the like, and appearance may be damaged. In a case where of equipping an apparatus such as a television, an air conditioner or an alarm sensor with the optical detection device A, the multi-segment lens 1 configures a part of the appearance of the apparatus. Therefore, the multi-segment lens 1 is preferably formed so that the first surfaces 110 are substantially flush with portions on the periphery of the first surfaces 110 on a surface of the apparatus, in order not to damage the design of the apparatus.

So, in a case of employing polyethylene as the lens material and producing the lenses by injection molding, the lenses 101 of the multi-segment lens 1 are each preferably configured such that the first surface 110 is a curved surface with a large curvature radius (curved surface with small curvature) as shown in FIGS. 15A and 15B. In this case, the lens thickness direction is a normal line direction of each point on the first surface 110. In this multi-segment lens 1, the first surfaces 110 are configured to be the curved surfaces that are convex toward sides opposite to the second surfaces 120, thereby being capable of suppressing a direction of waviness in one direction, and preventing appearance from being damaged. In addition, each lens 101 is preferably configured such that the first surface 110 has a curvature radius larger than the central lens surface 121 configured from a part of the hyperboloid 125 having an aspheric surface, and is a smoothly curved surface that is convex toward the side opposite to the hyperboloid 125.

In the multi-segment lens 1 according to the present embodiment, when the curvature of each first surface 110 is designed in a range where an off-axis aberration does not exceed an allowable value (less than or equal to the size of the infrared light receiving element 3), polyethylene is employed as the lens material, and occurrence of sink marks or waviness can be suppressed while suppressing occurrence of off-axis aberrations.

In the example shown in FIGS. 15A and 15B, while the lens surface 121 of the central lens portion 1a is configured by the part of the hyperboloid 125 similarly to the example shown in FIGS. 12A and 12B, in a case where the rotation axis OP1 of the hyperboloid 125 is inclined by 27.5 degrees similarly to the example of FIGS. 12A and 12B, the off-axis aberration becomes larger with respect to light beams incident at an incident angle of 45 degrees. Therefore, as in the example shown in FIGS. 15A and 15B, in a case where the first surface 110 is configured from the part of the spherical surface, the rotation axis OP1 of the hyperboloid 125 is further inclined while rotating about the apex $P_x$ of the hyperboloid 125 in an xz plane of a rectangular coordinate system defined as to this hyperboloid 125, thereby being capable of reducing the off-axis aberration.

The lens 101 shown in FIGS. 15A and 15B is preferably configured such that lines of intersection of the elliptical cones 130 and the hyperboloids 125 inscribed in the elliptical cones 130 intersect with the mountain portions 111b, similarly to the lens 101 of the example shown in FIGS. 12A and 12B. In the lens 101 in FIGS. 15A and 15B, the lines of intersection of the elliptical cones 130 and the hyperboloids 125 inscribed in the elliptical cones 130 exist on a plane surface 115 which has a height from a valley of the mountain portion 111b of each orbicular zone-shaped lens portion 101b that is a half of the maximum height of the mountain portion 111b. Therefore, in this lens 101, infrared light (light beams) passing on the intersections of the lens surfaces 121 and the plane surface 115 is collected on the focal point F, as shown in FIG. 15B.

In the lens 101 in FIGS. 15A and 15B, assuming that a rectangular coordinate system, in which the focal point of the hyperboloid 125 is employed as an origin, the rotation axis OP1 is employed as a z-axis, and an x-axis and a y-axis are orthogonal to the z-axis, is defined, the hyperboloid 125 of the central lens portion 101a is represented by the above-mentioned Formula (8). Assuming that rectangular coordinate systems, in which the apexes $P_1$ and $P_2$ are employed as origins, the central axes $CA_1$ and $CA_2$ are employed as z-axes, and x-axes are specified along major axis directions of ellipses in cross-sections orthogonal to the z-axes and y-axes are specified along minor axis directions, are defined, the elliptical cones $130_1$ and $130_2$ can be represented by the above-mentioned Formula (7).

Here, as an example of the lens 101, a lens including a central lens surface 121 configured from a part of a hyperboloid 125, and five lens surfaces 121 each configured from a part of a side surface of an elliptical cone 130 is exemplified. In the lens 101 of this example, the five elliptical cones 130 corresponding to the lens surfaces 121 that are a first orbicular zone to a fifth orbicular zone are represented as elliptical cones $130_1$ to $130_5$. In the lens 101 of this example, in a case where the first surface 110 is configured from a part of a spherical surface having a curvature radius of 100 mm, a minimum height t of a base portion configured from a portion other than each mountain portion 111b is 0.5 mm, a height (lens step) Δt of the mountain portion 111b on a point closest to a focal point F in each orbicular zone-shaped lens portion 101b is 0.05 mm, and polyethylene with a refractive index of 1.53 is employed as a lens material, values of coefficients a, b and c in Formula (8) or Formula (7) are shown in the following Table 5. Here, Table 5 shows values of a, b and c in Formula (8) as to the hyperboloid 125, and shows values of a, b and c in Formula (7) as to the elliptical cone $130_1$ to $130_5$. The coefficients a, b and c shown in Table 5 are values obtained under a precondition that a distance from an image surface I of the lens 101 to the plane surface parallel to the image surface I and being in contact with the first surface 110 is 5.5 mm, and infrared light (light beams) incident at an incident angle of 45 degrees is collected on the focal point F.

TABLE 5

| Lens Surface | Coefficient a | Coefficient b | Coefficient c |
| --- | --- | --- | --- |
| Hyperboloid 125 | 2.38 | 2.76 | 3.65 |
| Elliptical Cone $130_1$ | 13.24 | 9.74 | 1.74 |
| Elliptical Cone $130_2$ | 10.36 | 7.74 | 1.75 |
| Elliptical Cone $130_3$ | 8.78 | 6.66 | 1.76 |
| Elliptical Cone $130_4$ | 7.75 | 5.96 | 1.77 |
| Elliptical Cone $130_5$ | 7.01 | 5.46 | 1.78 |

Here, in each lens 101, as to the hyperboloid 125 corresponding to the lens surface 121 of the central lens portion 101a, the rotation axis OP1 of the hyperboloid 125 of the central lens portion 101a of the lens 101 shown in FIGS. 12A and 12B is inclined while rotating about the apex $P_x$ of the hyperboloid 125 in the xz plane by 2.5 degrees, thereby being capable of reducing an off-axis aberration. The normal lines of the respective points on the first surface 110 are directed to a curvature center of the first surface 110, and are inclined with respect to the central axes $CA_1$ and $CA_2$ of the respective lens surfaces 121 of the second surface 120 with which the normal lines intersect. $θ_1$ denotes an angle formed by the normal line of the image surface I, and the central axis $CA_1$ of the elliptical cone $130_1$ corresponding to the lens surface 121 which is the first orbicular zone, and $θ_2$ denotes an angle formed by the image surface I, and the central axis $CA_2$ of the elliptical cone $130_2$ corresponding to the lens surface 121 which is the second orbicular zone. Similarly, assuming that $θ_3$ denotes an angle formed by the normal line of the image surface I, and the central axis $CA_3$ of the elliptical cone $130_3$ corresponding to the lens surface 121 which is the third orbicular zone, $θ_4$ denotes an angle formed by the normal line of the image surface I, and the central axis $CA_4$ of the elliptical cone $130_4$ corresponding to the lens surface 121 which is the fourth orbicular zone, and $θ_5$ denotes an angle formed by the normal line of the image surface I, and the central axis $CA_5$ of the elliptical cone $130_5$ corresponding to the lens surface 121 which is the fifth orbicular zone, values of $θ_0$ to $θ_5$ are shown in the following Table 6.

TABLE 6

| | |
| --- | --- |
| $θ_1$ | 4.55° |
| $θ_2$ | 5.57° |
| $θ_3$ | 6.54° |
| $θ_4$ | 7.47° |
| $θ_5$ | 8.36° |

It is understood from Table 6 that in each lens 101 of the multi-segment lens 1, the angle, which is formed by a normal line of each point on the first surface 110 and a central axis of each lens surface 121 of the second surface 120 with which the normal line intersects, becomes larger as a orbicular zone-shaped lens portion 101b is located further outside.

Figure 16:
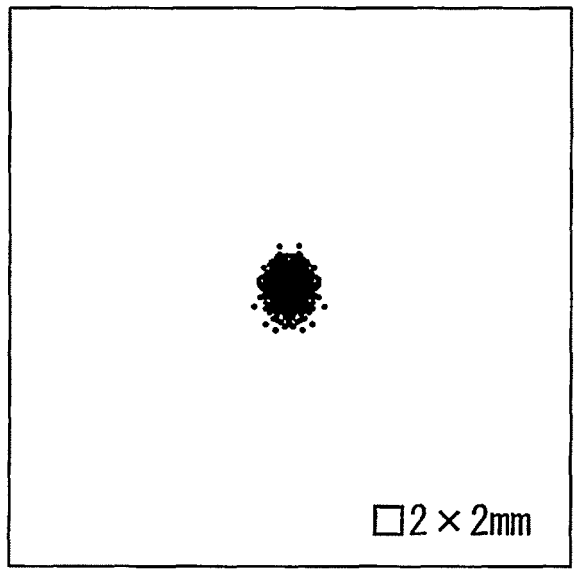
FIG. 16 is a spot diagram of a lens according to said yet another configuration example of the multi-segment lens of the optical detection device of the embodiment.

FIG. 16 shows a spot diagram of the focal point F of this lens 101. FIG. 16 shows a spot diagram in the range of 2*2 mm employing the focal point F as a center. The size of a focal spot should be less than or equal to the size of the infrared light receiving element 3 arranged so as to correspond to the focal point F of the lens 101 (here, 0.6*0.6 mm or less). When comparing FIG. 14 with FIG. 16, it is understood that the aberration of the lens 101 in FIG. 16 is equivalent to that of the lens 101 in FIG. 14.

In an apparatus 300 including the above-mentioned optical detection device A, for example, a front surface of an apparatus body 301 of the apparatus 300 is substantially flush with the first surface 110 of each lens 101 of the multi-segment lens 1 as shown in FIGS. 17A, 17B and 17C, and FIG. 18A, thereby being capable of setting a detection area 200 (see FIG. 18A) in front of the apparatus body 301, arranging the optical detection device A without damaging appearance of the apparatus 300, and enhancing the appearance of the apparatus 300. Here, in the apparatus 300 equipped with the optical detection device A, the front surface, on a side of which a human body is detected, of the apparatus body 301 is generally often formed in a substantial planar shape, and hence the first surface 110 of each lens 101 of the multi-segment lens 1 is substantially flush with the front surface of the apparatus body 301 so as to fit into the design of the apparatus body 301. The apparatus 300 according to the present embodiment includes the optical detection device A capable of suppressing occurrence of off-axis aberrations of the lenses 101 utilizing incident light obliquely incident upon the first surfaces 110 from the outside world, suppressing reduction of sensitivity, and reducing the cost, while enhancing the appearance of the multi-segment lens 1, by making it difficult to visually recognize lens patterns, which are formed on the second surface 120 sides of the respective lenses 101 of the multi-segment lens 1, from the first surface 110 sides of the respective lenses 101, and hence the appearance of the overall apparatus 300 equipped with the optical detection device A can be enhanced while suppressing the reduction of the sensitivity of the optical detection device A and reducing the cost. In a case where the apparatus 300 equipped with the optical detection device A is an alarm sensor, it is possible to be unable to visually recognize sink marks or lens patterns, and it is possible that a suspicious person cannot find a detection area of the alarm sensor. Thus, it is speculated that a human looking at the apparatus 300 can be inhibited from having a feeling of strangeness on the lens patterns of the multi-segment lens 1, and that mischief by the suspicious person or the like can be avoided.

The apparatus 300 in FIGS. 17A to 17C is a flat-screen television, and for example, the apparatus is brought into a halt state when a human gets out of the detection area of the optical detection device A during a power on state, thereby being capable of facilitating saving of energy, while an image is immediately displayed on a screen when the human returns into the detection area, thereby being capable of facilitating saving of energy. Here, in the apparatus 300, if the multi-segment lens 1 is designed such that the multi-segment lens 1 has a wide angle of view in a horizontal direction, that is, a horizontal angle of view is large, the optical detection device A can also detect the motion of a human looking at the screen from an oblique direction.

In a case of equipping a display of a television or a personal computer with the optical detection device A, a horizontal angle of view in a detection area is required to be large, while a vertical angle of view is not required to be large as compared with the horizontal angle of view. This is because vertical motion hardly occurs since a human usually sits on a chair when looking at the display of the television or the personal computer, or the like. Therefore, in the optical detection device A with which the display of the television or the personal computer, or the like is equipped, as a detection area to be formed, a detection area like the detection area 200 shown in FIG. 10B is more preferable than a detection area like the detection area 200 shown in FIG. 3B, in the light of detection of the small horizontal motion of the human.

In a case where the detection area 200 of the optical detection device A is set as shown in FIG. 3B, when the human passes through the detection area 200 along the right-left direction of FIG. 3B, it is conceivable that the human passes through the two detection beams 220 with different polarities, and output of the two device elements 31 of the infrared light receiving element 3 is offset, and hence a detection area like the detection area 200 of FIG. 6B, FIG. 10B, FIG. 9B or FIG. 18C may be more preferable than a detection area like the detection area 200 of FIG. 3B. In a case of the detection area as the detection area 200 of FIG. 6B, FIG. 10B, FIG. 9B or FIG. 18C, the size of a space between the adjacent detection beams 220 is reduced, and a possibility that when a human M moves in a right-left direction E as shown in FIG. 18A, the human M passes through the two detection beams 220 with different polarities and the output of the two device elements 31 of the infrared light receiving element 3 is offset becomes small.

Figure 18A:
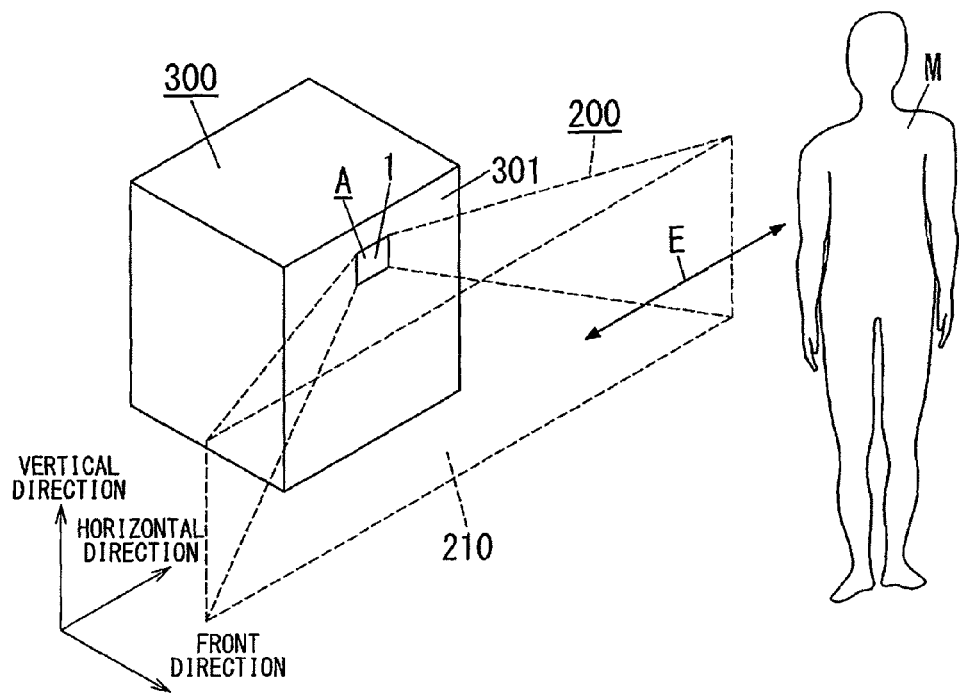
FIG. 18A is a schematic perspective view of another apparatus including the optical detection device of the embodiment.
Figure 18B:
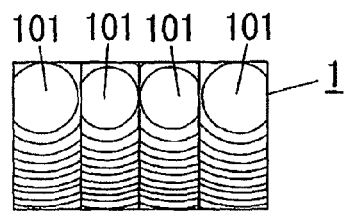
FIG. 18B is a schematic explanatory diagram of a multi-segment lens of said another apparatus including the optical detection device of the embodiment.
Figure 18C:
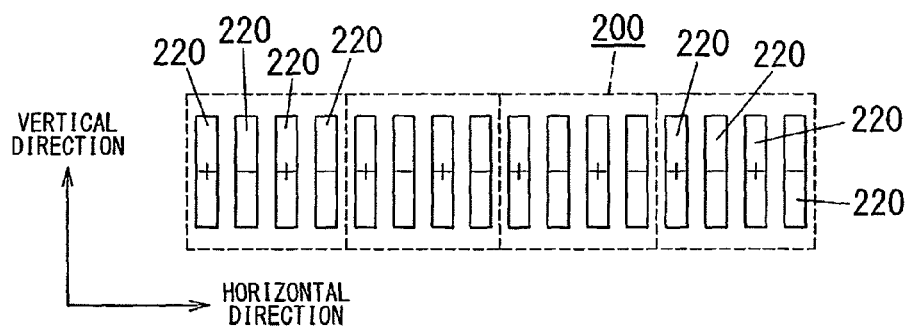
FIG. 18C is an explanatory diagram of a detection area of said another apparatus including the optical detection device of the embodiment.
Figure 19:
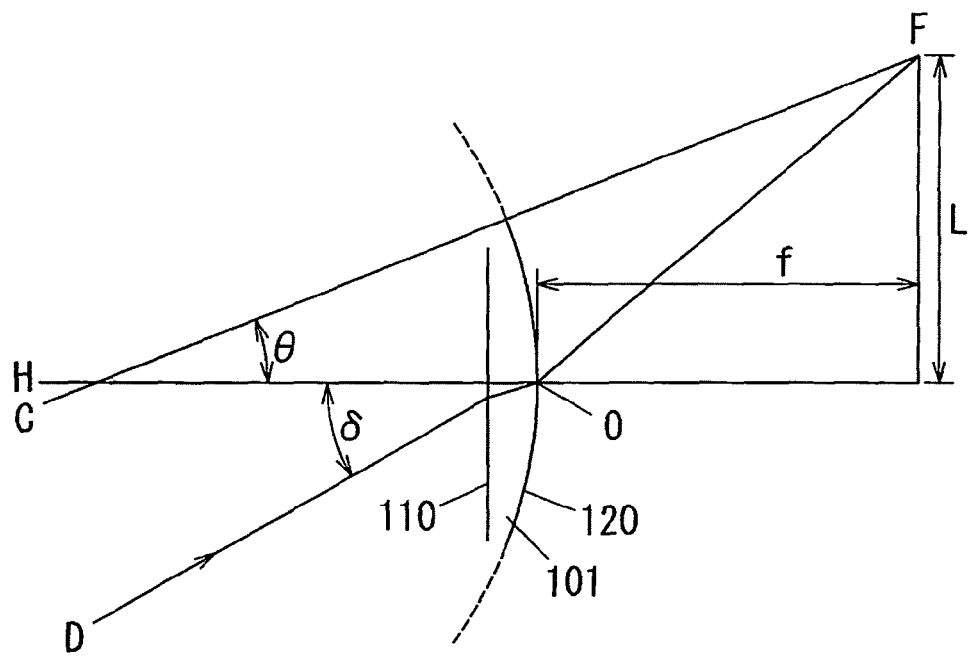
FIG. 19 is an explanatory diagram of a single lens of a multi-segment lens of a conventional optical detection device.
Figure 20A:
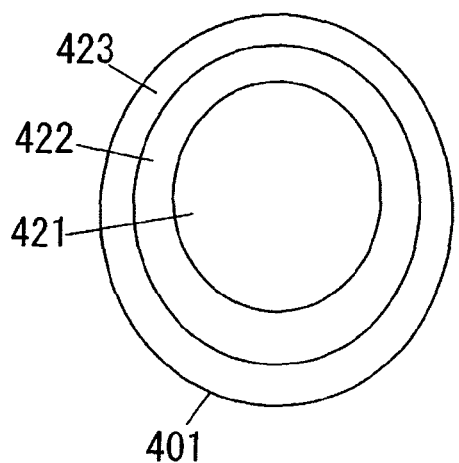
FIG. 20A is a bottom plan view of a Fresnel lens of another conventional example.
Figure 20B:
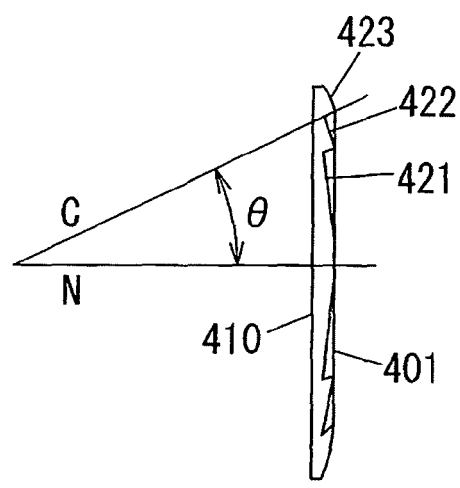
FIG. 20B is a cross-sectional view of the Fresnel lens of said another conventional example.

An apparatus 300 shown in FIG. 18A is a copy machine, and for example, the apparatus is brought into a halt state when the human M gets out of the detection area 200 of the optical detection device A during a power on state, thereby being capable of facilitating saving of energy, while the apparatus is immediately brought into an operable state when the human M gets into the detection area 200, thereby being capable of facilitating saving of energy. Here, the apparatus 300 is not limited to a copy machine, for example, in a case of a business machine such as a facsimile (FAX), a printer and a complex machine, saving of energy can be facilitated similarly. In the apparatus 300, when the respective lenses 101 of the multi-segment lens 1 of the optical detection device A are arranged so that only obliquely downward or obliquely upward detection beams 220 are formed, detection of the motion of the human M passing through a place distant from the apparatus 300 can be prevented, and the saving of energy can be further facilitated.

Examples of the apparatus equipped with the optical detection device A may include, for example, a vending machine, a ticket-vending machine, an automatic tellers machine (ATM), a cash dispenser (CD) and the like, and it is possible to release the halt state of the apparatus when a human approaching the apparatus gets into the detection area 200, and to bring the apparatus into an operable state immediately when the human stands in front of the apparatus. In a case of equipping each of these apparatuses with the optical detection device A, when the respective lenses 101 of the multi-segment lens 1 are arranged so that only downward or upward detection beams 220 are formed, the motion of a human passing through a place distant from the apparatus is not detected, and saving of energy can be facilitated. In each of these apparatuses, when the respective lenses 101 of the multi-segment lens 1 of the optical detection device A are arranged so that only obliquely downward or obliquely upward detection beams 220 are formed, detection of the motion of the human passing through the place distant from the apparatus can be prevented, and the saving of energy can be further facilitated.

Examples of the apparatus equipped with the optical detection device A may include, for example, a lighting apparatus, an air conditioner or the like, mounted on a wall. Also in a case of such apparatuses, detection of the vertical motion of a human is not important, and hence an optical detection device configured such that a detection area like the detection area 200 shown in FIG. 10B is formed is more preferable than an optical detection device configured such that a detection area like the detection area 200 shown in FIG. 3B is formed.

When the apparatus equipped with the optical detection device A is a wall-hanging lighting apparatus, the optical detection device A is preferably configured so that obliquely downward detection beams 220 are formed. In such a case, the lighting apparatus is turned on when a human approaches the lighting apparatus, and the lighting apparatus is turned off when the human is not present, thereby being capable of facilitating saving of energy.

In a case of equipping an apparatus for air conditioning control such as an air conditioner with the optical detection device A, the multi-segment lens 1 is preferably configured so that obliquely downward detection beams 220 are formed. This is because the motion of a human in a room can be detected by forming the obliquely downward detection beams 220 since the air conditioner and the like are set on a wall close to a ceiling of a room. Additionally, in the case of equipping the apparatus for air conditioning control such as the air conditioner with the optical detection device A, effective operation can be performed by intensively cooling or warming a place where the motion of the human exists.

In a case of equipping an apparatus such as a controller controlling a lighting apparatus mounted on a wall around an entrance of a room with the optical detection device A, the lighting apparatus is turned on immediately when a human enters a room, and the lighting apparatus is turned off when the human is not present, thereby being capable of facilitating saving of energy.

The infrared light receiving element 3 is not limited to a pyroelectric infrared detecting element, and may be, for example, a light receiving element such as a photodiode.

Although the present invention has been described with reference to certain preferred embodiments, numerous modifications and variations can be made by those skilled in the art without departing from the true spirit and scope of this invention, namely claims.

The invention claimed is:

1. An optical detection device comprising:
    a multi-segment lens configured by combining a plurality of lenses having a same focal position; and
    an infrared light sensor having an infrared light receiver arranged on the focal position,
    wherein each of the plurality of lenses of the multi-segment lens is a Fresnel lens in which a second surface, being a reverse side surface of a first surface, has a plurality of lens surfaces, at least one of the plurality of lens surfaces is configured from a part of a side surface of an elliptical cone, and
    wherein any normal line intersecting with the lens surface configured from the part of the side surface of the elliptical cone among normal lines of respective points on the first surface is non-parallel to a central axis of the elliptical cone corresponding to the lens surface with which the any normal line intersects.

2. The optical detection device according to claim 1,
wherein at least two of the plurality of lens surfaces are configured from parts of side surfaces of elliptical cones having different central axes respectively, and
wherein as a lens surface among the at least two of the plurality of lens surfaces is located further outside, an angle formed by the normal line and the central axis of the elliptical cone corresponding to the lens surface becomes larger.

3. The optical detection device according to claim 1,
wherein a lens surface located on a center among the plurality of lens surfaces of each of the plurality of lenses is configured from a part of an aspheric surface with continuously changing curvature, and
wherein any normal line intersecting with the lens surface that is located on the center and is configured from the part of the aspheric surface among the normal lines of the respective points on the first surface is non-parallel to an axis of symmetry of the aspheric surface corresponding to the lens surface located on the center with which the any normal line intersects.

4. The optical detection device according to claim 3,
wherein the aspheric surface is a hyperboloid.

5. The optical detection device according to claim 1,
wherein the multi-segment lens is configured so that, among the plurality of lenses, a lens which is further separated from a center of the multi-segment lens has a larger lens area of the second surface.

6. The optical detection device according to claim 1,
wherein the multi-segment lens is configured so that maximum thicknesses of the plurality of lenses are the same.

7. The optical detection device according claim 1,
wherein the infrared light receiver includes a plurality of light receivers each comprising a rectangle, and the plurality of light receivers are arranged so that short side directions of the plurality of light receivers coincide with each other.

8. The optical detection device according to claim 1,
wherein the infrared light receiver is configured by arranging four light receivers in the form of a 2*2 matrix, each of the four light receivers comprising a square, and
wherein the four light receivers are arranged so that a direction, in which respective single diagonal lines of two light receivers located on diagonal positions among the four light receivers are connected with a straight line, coincides with a right-left direction.

9. The optical detection device according to claim 8,
wherein arrangement of a plurality of detection beams formed by the plurality of lenses of the multi-segment lens and the infrared receiver is staggered.

10. The optical detection device according to claim 1,
wherein the plurality of lenses include a first lens group linearly arranged along at least one direction,
wherein the infrared light receiver is configured by arranging four light receivers in the form of a 2*2 matrix, each of the four light receivers comprising a square, and
wherein the light receivers are arranged so that a direction, in which respective single diagonal lines of two light receivers located on diagonal positions among the four light receivers are connected with a straight line, coincides with the one direction.

11. The optical detection device according to claim 10,
wherein the plurality of lenses further include a second lens group adjacent to the first lens group and arranged along the one direction, and
wherein among the plurality of lenses, lenses of the second lens group are arranged to be staggered with respect to lenses of the first lens group.

12. The optical detection device according to claim 1,
wherein a lens material of the multi-segment lens is polyethylene.

13. The optical detection device according claim 1,
wherein a lens material of the multi-segment lens is polyethylene, and the first surface is a curved surface that is convex toward a side opposite to the second surface.

14. An apparatus comprising the optical detection device according to claim 1.

* * * * *